(12) United States Patent
Suzuki et al.

(10) Patent No.: US 8,134,775 B2
(45) Date of Patent: Mar. 13, 2012

(54) RAMAN AMPLIFIER WITH SIGNAL MODULATED BEFORE STIMULATED BRILLOUIN SCATTERING OCCURS

(75) Inventors: Yuichi Suzuki, Kawasaki (JP); Norifumi Shukunami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 297 days.

(21) Appl. No.: 12/401,892

(22) Filed: Mar. 11, 2009

(65) Prior Publication Data
US 2009/0237779 A1 Sep. 24, 2009

(30) Foreign Application Priority Data
Mar. 18, 2008 (JP) .................................. 2008-68741

(51) Int. Cl.
*H04B 10/17* (2006.01)
*H01S 3/30* (2006.01)
*H04B 10/12* (2006.01)

(52) U.S. Cl. ................. 359/334; 359/341.4; 359/341.43

(58) Field of Classification Search .................. 359/334, 359/341.4, 341.43
See application file for complete search history.

(56) References Cited

U.S. PATENT DOCUMENTS

| 5,477,368 | A | * | 12/1995 | Eskildsen et al. | 398/147 |
| 5,754,334 | A | * | 5/1998 | Artiglia et al. | 359/332 |
| 5,900,959 | A | * | 5/1999 | Noda et al. | 398/195 |
| 6,072,614 | A | * | 6/2000 | Roberts | 398/177 |
| 6,516,113 | B1 | * | 2/2003 | Glingener et al. | 385/24 |
| 2002/0135866 | A1 | * | 9/2002 | Sasaoka et al. | 359/334 |
| 2004/0036956 | A1 | * | 2/2004 | Mao et al. | 359/341.3 |

FOREIGN PATENT DOCUMENTS
EP 581525 A1 * 2/1994
JP 2006-74344 3/2006
* cited by examiner

*Primary Examiner* — Eric Bolda
(74) *Attorney, Agent, or Firm* — Staas & Halsey LLP

(57) ABSTRACT

An optical amplifier includes a light source that outputs light having an intensity corresponding to a supplied driving power; a modulator that modulates the light output from the light source in response to an input modulation signal; a Raman amplifier that performs Raman amplification on the light modulated by the modulator using a highly-nonlinear medium; and a driver that supplies the driving power to drive the light source and inputs the modulation signal to the modulator. The driver starts inputting the modulation signal to the modulation unit before the intensity of the light propagating through the Raman amplifier exceeds an intensity value at which stimulated Brillouin scattering occurs in the Raman amplifier.

11 Claims, 21 Drawing Sheets

RAMAN AMPLIFIER WITH SIGNAL MODULATED BEFORE STIMULATED BRILLOUIN SCATTERING OCCURS

CROSS-REFERENCE TO RELATED APPLICATIONS

This application is based upon and claims the benefit of priority of the prior Japanese Patent Application No. 2008-068741, filed on Mar. 18, 2008, the entire contents of which are incorporated herein by reference.

BACKGROUND

1. Field

The present invention relates to an optical amplifier including a Raman amplifier, and may be applied to an optical amplifier that uses a highly-nonlinear medium to perform Raman amplification or a method of driving the optical amplifier.

2. Description of the Related Art

A loss of signal light transmitted from a transmitter occurs in an optical communication system while the signal light propagates through a transmission path. An intensity of the signal light received by a receiver is lowered. If the intensity of the signal light received by the receiver is less than a specific value (specific threshold value), a reception error occurs, and it is difficult to transmit the signal light normally. Therefore, generally, an optical amplifier is provided between the transmitter and the receiver to amplify the signal light, thereby compensating for the loss.

The optical amplifier is a particularly important optical component in a case of long-distance transmission. Communication demands have increased in recent years with the widespread use of the Internet, and a wavelength division multiplexing (WDM) system using the wide bandwidth of an optical amplifier has been used. In addition, a WDM system having a wavelength routing function, which adds or drops signal lights by wavelength, has been used for a metro ring network together with an optical amplifier.

Examples of the optical amplifier include a rare earth-added optical fiber amplifier, a semiconductor optical amplifier (SOA), and an optical fiber Raman amplifier. Examples of rare earth elements added to the rare earth-added optical fiber amplifier include Er (erbium) that amplifies a wavelength band of 1525 nm to 1625 nm, Tm (thulium) that amplifies a wavelength band of 1480 nm to 1510 nm, and Pr (praseodymium) that amplifies a wavelength band of 1300 nm.

An Er-doped fiber amplifier (EDFA) that has generally been used in an optical communication system has a high gain characteristic, a low noise figure (NF), and a high saturation output power characteristic.

For example, a post-amplifier, a pre-amplifier, and an inline amplifier are used in an optical communication system. The post-amplifier is arranged on the output side of a transmitter, the pre-amplifier is arranged before a receiver, and the inline amplifier is provided in the case of multistage relay.

A CWDM (coarse WDM) system performs wavelength division multiplexing at a coarse interval of 20 nm in a wide wavelength band of 1470 nm to 1610 nm. As the CWDM system uses the coarse signal light interval, optical multiplexer or demultiplexer used in the CWDM between do not need less correctness about wavelength than in DWDM system and can be relatively inexpensive.

In the CWDM system, the optical amplifier can be used to transmit data over 100 km. In the CWDM system, a Raman amplifier has been used which amplifies a signal in a wavelength band (S-band) of 1470 nm which is difficult to amplify at the EDFA and is capable of freely selecting an amplification band in order to ensure a wide bandwidth, as disclosed in Japanese Laid-open Patent Publication No. 2006-074344, for example.

The Raman amplifier is an optical amplifier that uses Raman amplification in an optical fiber. The Raman amplification amplifies signal light using stimulated Raman scattering that occurs when pumping light is input to an optical fiber. The Raman amplifier is characterized in that it has a low noise figure.

For example, any of the following amplifiers is used as the Raman amplifier of the optical communication system: a distributed Raman amplifier (DRA) in which an optical fiber of a transmission path is used as an amplification medium and pumping light is input from a station to the optical fiber; and a lumped Raman amplifier (LRA) in which a highly-nonlinear optical fiber module is arranged in a station and pumping light is input to the highly-nonlinear optical fiber module. In the CWDM system, the lumped Raman amplifier (hereinafter, referred to as an LRA) capable of effectively performing Raman amplification has generally been used.

The lumped Raman amplifier uses a highly-nonlinear medium to perform Raman amplification. Therefore, various nonlinear phenomena other than Raman amplification occur, and noise light is generated in the signal light subjected to the Raman amplification. Examples of the nonlinear phenomena other than Raman amplification include self phase modulation (SPM), cross phase modulation (XPM), stimulated Brillouin scattering (SBS), and four wave mixing (FWM).

In particular, the stimulated Brillouin scattering is a nonlinear phenomenon involving wavelength (frequency) conversion, and noise light having a wavelength that is different from that of signal light is generated by the stimulated Brillouin scattering. Therefore, in the WDM system, when the stimulated Brillouin scattering occurs in the signal light, noise light leaks to adjacent channels, and signal light of the adjacent channels is deteriorated by crosstalk.

The stimulated Brillouin scattering propagates through the highly-nonlinear medium in a direction that is opposite to the propagating direction of the signal light. Therefore, the stimulated Brillouin scattering does not matter in a one-way optical communication system. In addition, a wavelength shift is of the order of 0.01 nm in a two-way optical communication system, and crosstalk does not occur in other signal light components.

However, the stimulated Brillouin scattering consecutively occurs, and the wavelength shift is increased to several tens of nanometers when a highly-nonlinear medium having a relatively short length is used to intensely perform Raman amplification as in the lumped Raman amplifier. Therefore, crosstalk occurs in the WDM system using the lumped Raman amplifier in other signal light components due to the stimulated Brillouin scattering.

FIG. 18 is a graph illustrating a spectrum of light output from the lumped Raman amplifier when the intensity of input light is low. In FIG. 18, the spectrum of output light is illustrated when light having a wavelength of 1567 nm is input to the lumped Raman amplifier with sufficiently low intensity. In this case, no stimulated Brillouin scattering occurs, and only a component 1810, which is an amplified component of input light, is output.

FIG. 19 is a graph illustrating a spectrum of light output from the lumped Raman amplifier when the intensity of input light is high. In FIG. 19, the spectrum of output light is illustrated when light having a wavelength of 1567 nm is input to the lumped Raman amplifier with an intensity that is 2.3 dBm higher than that shown in FIG. 18. In this case, stimulated Brillouin scattering occurs, and the component 1810, which is an amplified component of input light, and a noise light component 1910 generated due to the stimulated Brillouin scattering are output.

As described above, stimulated Brillouin scattering occurs when the intensity of light input to a highly-nonlinear medium is greater than a specific intensity value. Therefore, stimulated Brillouin scattering occurs in the WDM system when a new channel is added by driving a new LD (Laser Diode) and a total intensity of light input to a highly-nonlinear medium is rapidly increased, for example.

FIG. 20 is a graph illustrating light output from the lumped Raman amplifier when a channel is added. In FIG. 20, the horizontal axis indicates time, and the vertical axis indicates the intensity of light. Reference numeral 2010 denotes light input to the lumped Raman amplifier. Reference numeral 2020 denotes light output from the lumped Raman amplifier. Only a transmitter having a wavelength of 1530.8 nm is driven in the WDM system during a period T1.

A transmitter having a wavelength of 1512.9 nm is newly driven at a time t1 after the period T1. A newly added transmitter outputs continuous light during a period T2 after the time t1, without modulation. Light output from the newly added transmitter is modulated during a period T3 after the period T2.

In FIG. 20 of the conventional optical amplifier, noise light is generated in the output light 2020 due to stimulated Brillouin scattering during the period T2. In FIG. 20, noise light (reference numeral 2040) of about ±2.5 dB is generated in the output light 2020.

FIG. 21 is a graph illustrating light output from the lumped Raman amplifier when a channel is added. In FIG. 21, the same components as those shown in FIG. 20 are denoted by the same reference numerals, and a description thereof will be omitted. In FIG. 21, output light is illustrated when a transmitter having a wavelength of 1510 nm is newly added, instead of the transmitter having a wavelength of 1512.9 nm shown in FIG. 20. During a period T1, only a transmitter having a wavelength of 1530.8 nm is driven in the WDM system.

The transmitter having a wavelength of 1510 nm is newly driven at a time t1 after the period T1. The transmitter having a wavelength of 1510 nm outputs continuous light during a period T2 after the time t1. As shown in FIG. 21, noise light is continuously generated in the output light 2020 due to stimulated Brillouin scattering during the period T2.

As illustrated in FIG. 19, stimulated Brillouin scattering occurs on the longer wavelength side of signal light. By adding a channel to the longer wavelength side of the channel that is in service, the occurrence of crosstalk in other signal light components due to stimulated Brillouin scattering is prevented. However, the order in which channels are added is strictly limited.

SUMMARY

An optical amplifier includes a light source that outputs light having an intensity corresponding to a supplied driving power; a modulator that modulates the light output from the light source in response to an input modulation signal; a Raman amplifier that performs Raman amplification on the light modulated by the modulator using a highly-nonlinear medium; and a driver that supplies the driving power to drive the light source and inputs the modulation signal to the modulator.

The driver starts inputting the modulation signal to the modulation unit before the intensity of the light propagating through the Raman amplifier exceeds an intensity value at which stimulated Brillouin scattering occurs in the Raman amplifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

DETAILED DESCRIPTION OF THE PREFERRED EMBODIMENTS

Figure 1:
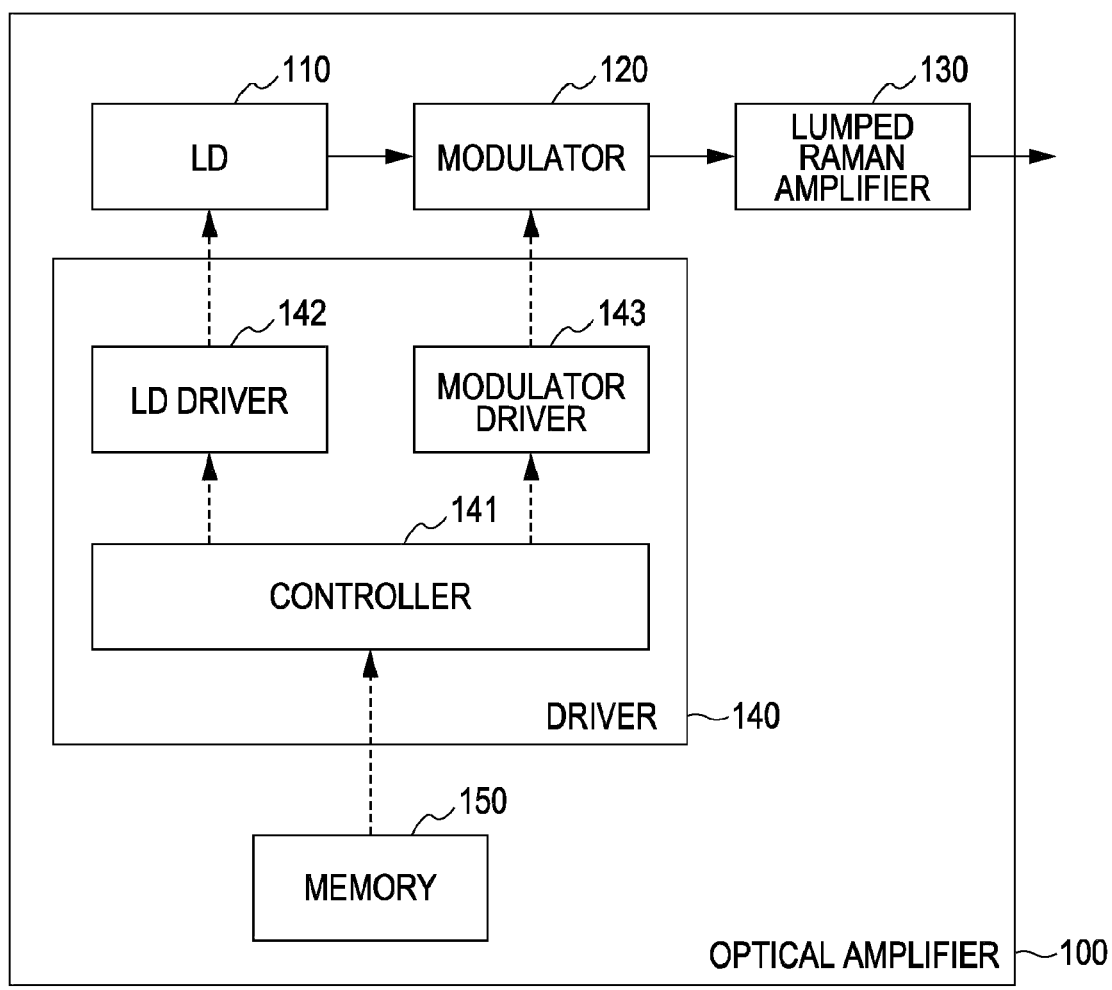
FIG. 1 is a diagram illustrating an optical amplifier according to a first embodiment.

Reference may now be made in detail to embodiments of the present invention, examples of which are illustrated in the accompanying drawings, wherein like reference numerals refer to like elements throughout.

FIG. 1 is a diagram illustrating an optical amplifier according to a first embodiment. In FIG. 1, a solid arrow indicates the propagation of light, and a dotted arrow indicates the flow of electricity (which is similarly applied to the other drawings). As illustrated in FIG. 1, an optical amplifier 100 according to the first embodiment generates light, modulates the light, and performs Raman amplification on the modulated light. The optical amplifier 100 includes an LD 110, a modulator 120, a lumped Raman amplifier 130, a driver 140, and a memory 150.

The LD 110 is a light source that outputs continuous light to the modulator 120. The LD 110 outputs light having an intensity corresponding to driving power supplied from the driver 140. The modulator 120 modulates the light output from the LD 110 and outputs the modulated light to the lumped Raman amplifier 130. The modulator 120 modulates input light in response to a modulation signal input by the driver 140 and outputs the modulated light. When no modulation signal is input, the modulator 120 outputs the input light without modulating it.

Various modulation schemes, such as intensity modulation or phase modulation, may be used for the modulator 120. The LD 110 and the modulator 120 may be separately provided, or they may be integrally provided. In FIG. 1, the modulator 120 is an external modulator that modulates light output from the LD 110. However, it may be an internal modulator that is provided integrally with the LD 110.

The lumped Raman amplifier 130 amplifies an optical signal output from the modulator 120. The driver 140 includes a controller 141, a LD driver 142, and a modulator driver 143. The controller 141 supplies driving power to the LD 110 through the LD driver 142 to drive the LD 110. In addition, the controller 141 inputs a modulation signal to the modulator 120 through the modulator driver 143 to control the modulator 120.

The controller 141 inputs a modulation signal to the modulator 120 before the intensity of light propagating through the lumped Raman amplifier 130 exceeds an intensity value at which stimulated Brillouin scattering occurs in the lumped Raman amplifier 130, thereby modulating light input to the lumped Raman amplifier 130. The controller 141 inputs the modulation signal to the modulator 120, for example, before driving power is supplied to the LD 110.

The controller 141 is, for example, a CPU (central processing unit). For example, the LD driver 142 is a DA (digital-analog) converter that converts driving power which is output as a digital signal from the controller 141 into an analog signal and outputs the analog signal to the LD 110. In addition, the modulator driver 143 is a DA converter that converts a digital modulation signal that is output from the controller 141 into an analog signal, and outputs the analog signal to the modulator 120.

The memory 150 is a storage unit that stores information for allowing the controller 141 to determine whether the intensity of light input to the lumped Raman amplifier 130 is greater than an intensity threshold value at which stimulated Brillouin scattering occurs in the lumped Raman amplifier 130. For example, the memory 150 stores, as a power threshold value, the driving power obtained when the stimulated Brillouin scattering occurs. In addition, the memory 150 may store, as an intensity threshold value, the intensity of light input to the lumped Raman amplifier 130 when the stimulated Brillouin scattering occurs.

Figure 2:
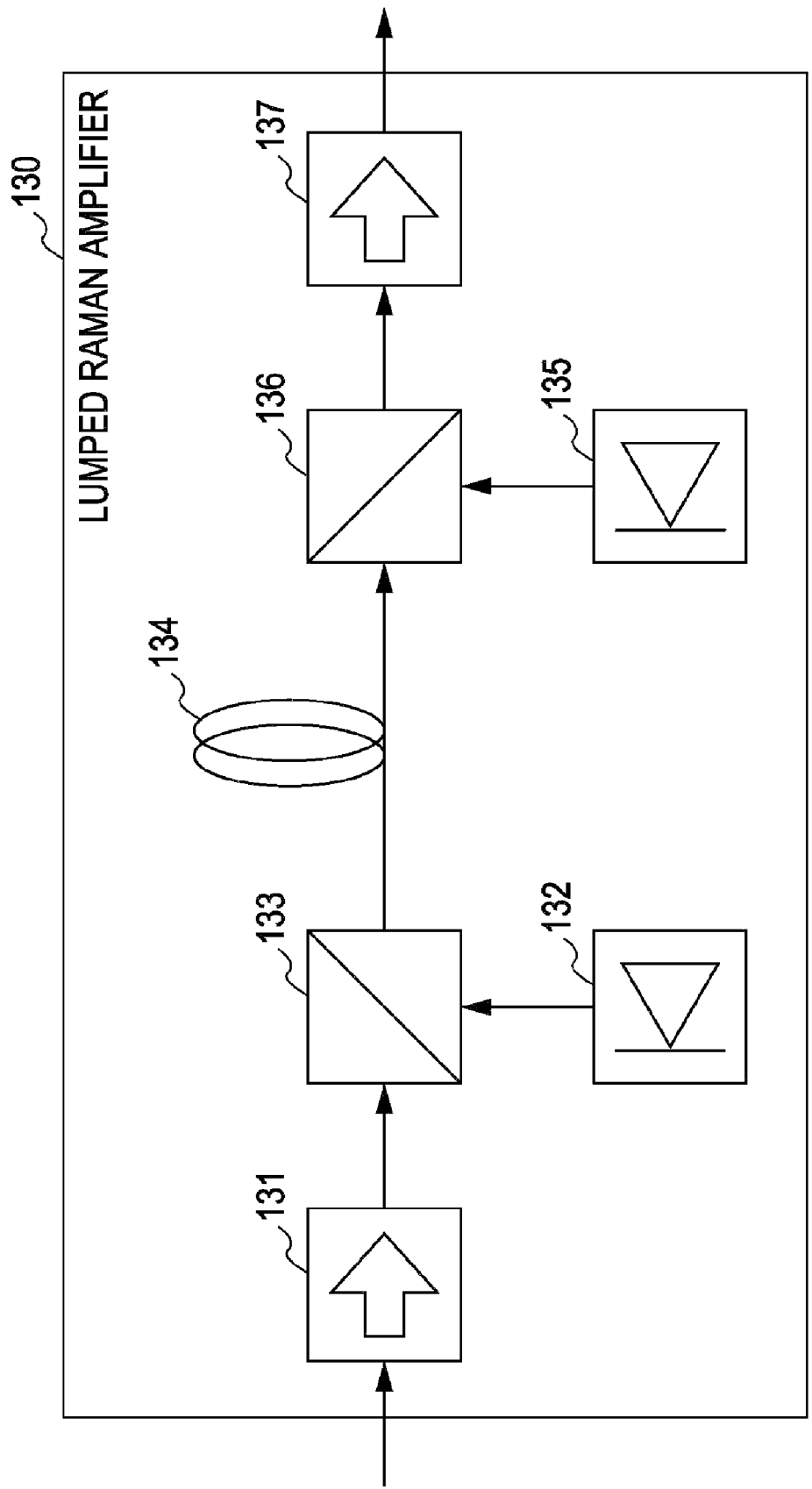
FIG. 2 is a diagram illustrating an example of a lumped Raman amplifier illustrated in FIG. 1.

FIG. 2 is a diagram illustrating the lumped Raman amplifier illustrated in FIG. 1. The lumped Raman amplifier 130 is a Raman amplifier that performs Raman amplification using a highly-nonlinear medium and pumping light. As illustrated in FIG. 2, the lumped Raman amplifier 130 includes an isolator 131, a pumping light source 132, an optical multiplexer 133, a highly-nonlinear optical fiber 134, a pumping light source 135, an optical multiplexer 136, and an isolator 137.

The isolator 131 outputs light output from the modulator 120 to the optical multiplexer 133. In addition, the isolator 131 rejects light input from the optical multiplexer 133 to the isolator 131. In this way, it is possible to prevent pumping light output from the pumping light source 135 from leaking to a previous stage of the lumped Raman amplifier 130.

The pumping light source 132 generates pumping light and outputs it to the optical multiplexer 133. The optical multiplexer 133 multiplexes the pumping light output from the pumping light source 132 with light output from the isolator 131 and outputs the multiplexed light to the highly-nonlinear optical fiber 134.

The pumping light source 135 generates pumping light and outputs it to the optical multiplexer 136. The optical multiplexer 136 outputs the pumping light output from the pumping light source 135 to the highly-nonlinear optical fiber 134, and outputs light output from the highly-nonlinear optical fiber 134 to the isolator 137. The isolator 137 outputs the light output from the optical multiplexer 136 to the outside of the lumped Raman amplifier 130.

The highly-nonlinear optical fiber 134 (HNLF) inputs the pumping light and the light output from the optical multiplexer 133, and inputs the pumping light output from the optical multiplexer 136.

A highly-nonlinear medium having a large Raman gain coefficient, such as a dispersion compensating fiber (DCF) or a dispersion flattened fiber (DFF), may be used instead of the highly-nonlinear optical fiber 134.

The lumped Raman amplifier 130 is a Raman amplifier that performs a combination of forward Raman amplification that inputs pumping light from the previous stage of the highly-nonlinear optical fiber 134 to the highly-nonlinear optical fiber and backward Raman amplification that inputs pumping light from the rear stage of the highly-nonlinear optical fiber 134 to the highly-nonlinear optical fiber 134. Therefore, the lumped Raman amplifier 130 can perform effective Raman amplification.

The lumped Raman amplifier 130 may be a forward Raman amplifier. In a forward Raman amplifier, the pumping light source 135 and the optical multiplexer 136 are omitted and Raman amplification is performed by only the pumping light output from the pumping light source 132. The lumped Raman amplifier 130 may also be a backward Raman amplifier. In a backward Raman amplifier, the pumping light source 132 and the optical multiplexer 133 are omitted and Raman amplification is performed by only the pumping light output from the pumping light source 135.

Figure 3:
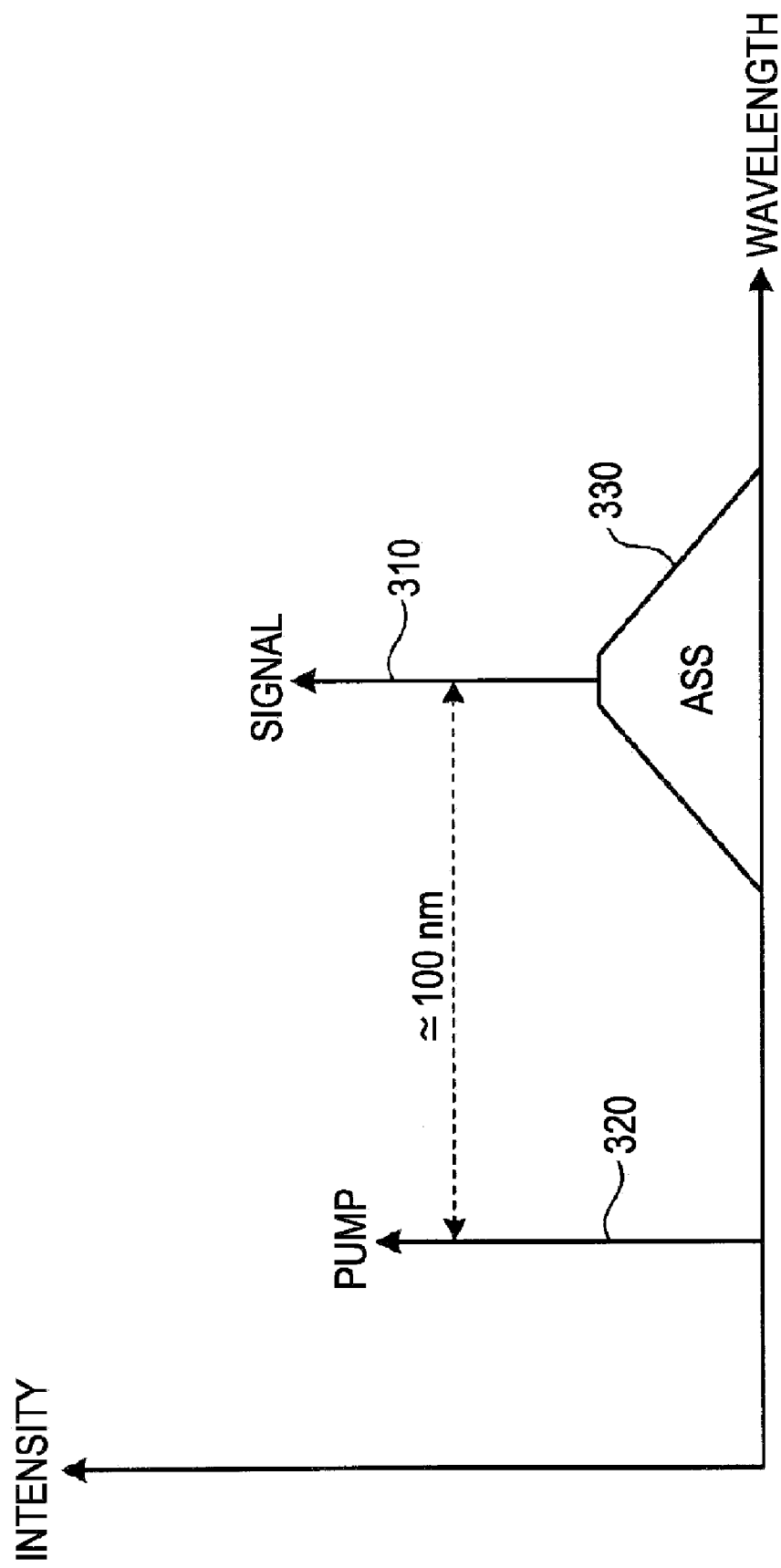
FIG. 3 is a diagram illustrating Raman amplification performed by the lumped Raman amplifier.

FIG. 3 is a diagram illustrating Raman amplification performed by the lumped Raman amplifier. In FIG. 3, the horizontal axis indicates the wavelength of light, and the vertical axis indicates the intensity of light. Reference numeral 310 (Signal) denotes light that is output from the modulator 120 and propagates through the highly-nonlinear optical fiber 134. Reference numeral 320 (Pump) denotes pumping light output from the pumping light source 132 and the pumping light source 135 and propagates through the highly-nonlinear optical fiber 134.

Reference numeral 330 (ASS) denotes ASS (amplified spontaneous scattering) noise light included in the light 310 (Signal). When the pumping light 320 travels through the highly-nonlinear optical fiber 134, a Raman gain is generated in a wavelength region that is about 100 nm longer than the wavelength of the pumping light 320 by simulated Raman scattering. Therefore, when the wavelength of the pumping light 320 is set to be about 100 nm shorter than the wavelength of the light 310 (Signal), it is possible to amplify the light 310 (Signal).

Figure 4:
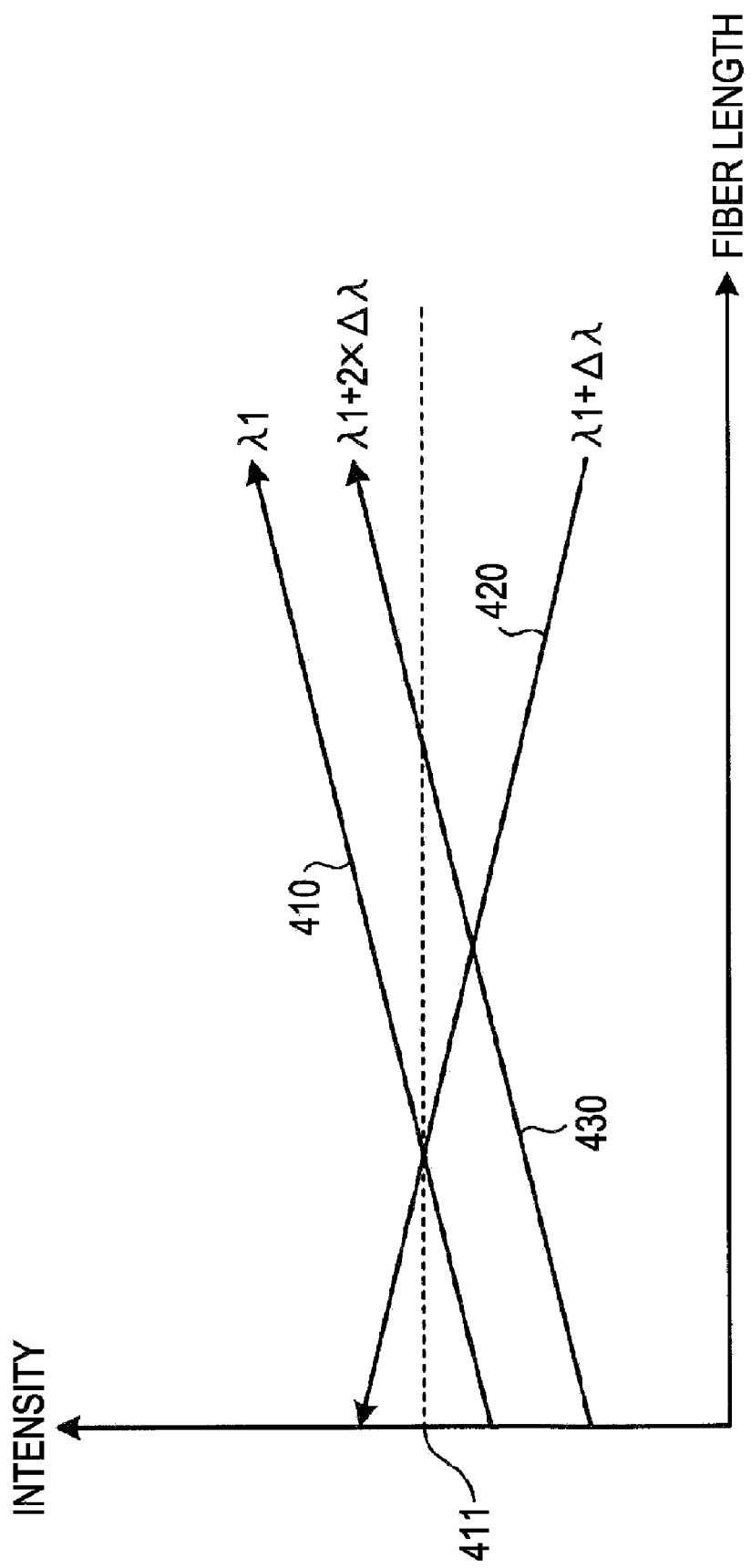
FIG. 4 is a diagram illustrating stimulated Brillouin scattering occurring in the lumped Raman amplifier.

FIG. 4 is a diagram illustrating stimulated Brillouin scattering occurring in the lumped Raman amplifier. In FIG. 4, the horizontal axis indicates the length of the highly-nonlinear optical fiber 134 of the lumped Raman amplifier 130, and the vertical axis indicates the intensity of light. Reference numeral 410 denotes light propagating through the highly-nonlinear optical fiber 134. In FIG. 4, reference numeral 410 corresponds to the light 310 (Signal) illustrated in FIG. 3. The wavelength of the light 410 is λ1.

The light 410 propagating through the highly-nonlinear optical fiber 134 is subjected to Raman amplification while propagating through the highly-nonlinear optical fiber 134. The intensity of the light 410 propagating through the highly-nonlinear optical fiber 134 is obtained by adding the Raman gain to the intensity of light input to the highly-nonlinear optical fiber 134 and subtracting the loss of the highly-nonlinear optical fiber 134 from the added value.

A threshold value 411 indicates a threshold value of the intensity of the light 410 propagating through the highly-nonlinear optical fiber 134 at which stimulated Brillouin scattering occurs in the highly-nonlinear optical fiber 134. If the intensity of the light 410 is greater than the threshold value 411, stimulated Brillouin scattering light 420 that propagates through the highly-nonlinear optical fiber 134 in a direction that is opposite to the propagating direction of the light 410 is generated in the highly-nonlinear optical fiber 134. The wavelength of the stimulated Brillouin scattering light 420 is λ1+Δλ that is shifted by Δλ from the wavelength λ1 of light.

Similarly to the light 410, the stimulated Brillouin scattering light 420 is subjected to Raman amplification while propagating through the highly-nonlinear optical fiber 134. If the intensity of the stimulated Brillouin scattering light 420 is greater than the threshold value 411, stimulated Brillouin scattering light 430 that propagates through the highly-nonlinear optical fiber 134 in a direction that is opposite to the propagating direction of the stimulated Brillouin scattering light 420 is generated. The wavelength of the stimulated Brillouin scattering light 430 is λ1+2×Δλ that is shifted by Δλ from the wavelength λ1+Δλ of the stimulated Brillouin scattering light 420.

Although not shown in the drawings, the stimulated Brillouin scattering light 430 is also subjected to Raman amplification while propagating through the highly-nonlinear optical fiber 134. If the intensity of the stimulated Brillouin scattering light 430 is greater than the threshold value 411, stimulated Brillouin scattering light is generated in the highly-nonlinear optical fiber 134. As such, in the lumped Raman amplifier 130, Raman amplification is performed by the highly-nonlinear optical fiber 134, and stimulated Brillouin scattering consecutively occurs.

Figure 5:
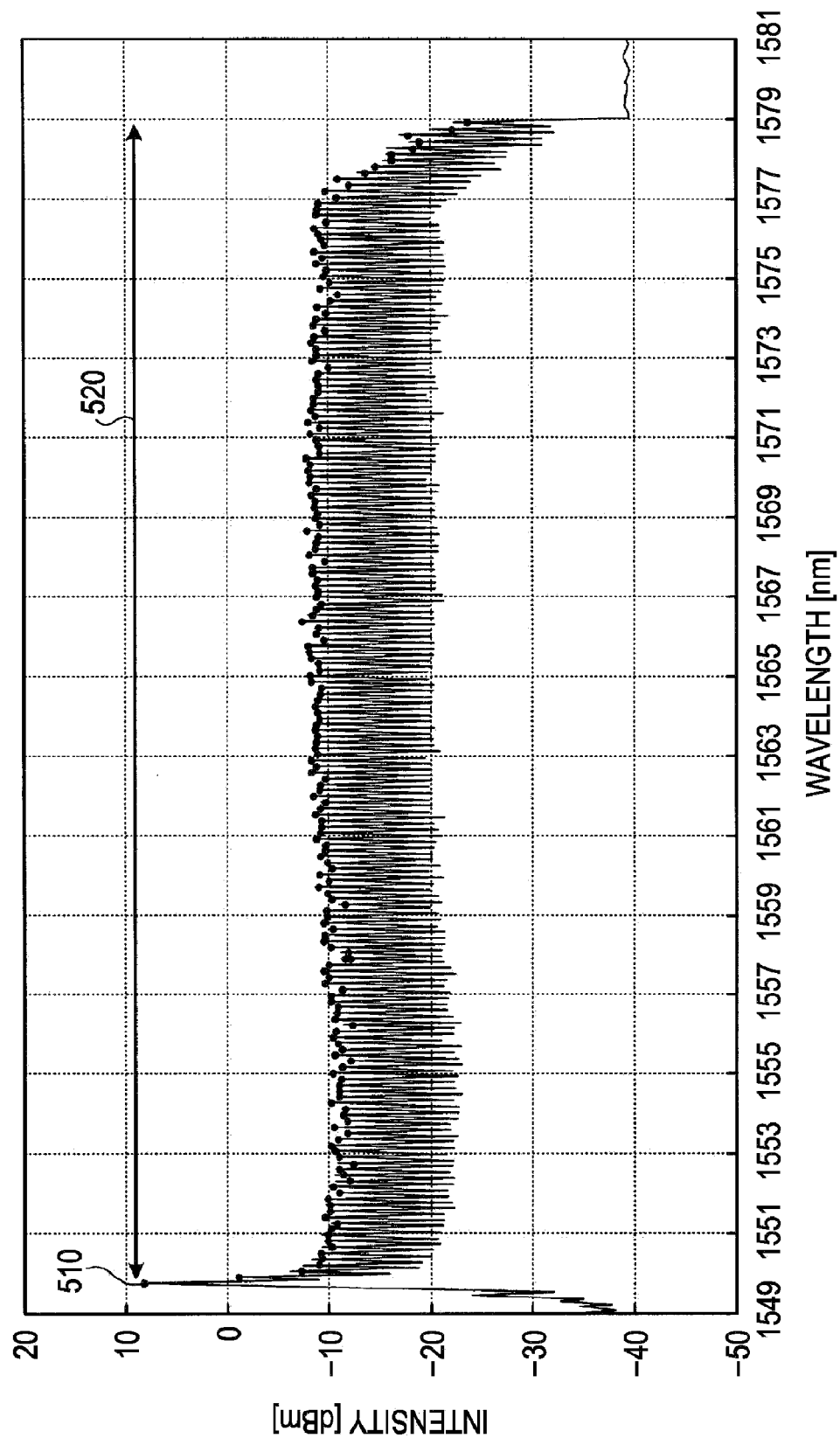
FIG. 5 is a diagram illustrating a spectrum when the stimulated Brillouin scattering consecutively occurs.

FIG. 5 is a graph illustrating a spectrum when stimulated Brillouin scattering consecutively occurs. In FIG. 5, the horizontal axis indicates the wavelength [nm] of light output from the lumped Raman amplifier 130, and the vertical axis indicates the intensity [dBm] of light. A light component 510 is an amplified component (wavelength: 1549.76 nm) of light (the light 410 of FIG. 4) input to the highly-nonlinear optical fiber 134.

A light component 520 having a wavelength that is longer than that of the light component 510 is of the stimulated Brillouin scattering light that has been consecutively generated. In this embodiment, 198 light components 520 are observed at an interval of 0.148 nm (Δλ of FIG. 4) in the wavelength range of 29.2 nm. As such, since the stimulated Brillouin scattering that consecutively occurs in the lumped Raman amplifier 130 involves wavelength conversion in a wide bandwidth, the stimulated Brillouin scattering causes crosstalk in another channel in a WDM system, which results in deterioration of signal quality.

Next, the threshold value (the threshold value 411 of FIG. 4) of the intensity of light propagating through the highly-nonlinear optical fiber 134 at which stimulated Brillouin scattering occurs in the highly-nonlinear optical fiber 134 will be described. In the highly-nonlinear optical fiber 134, a threshold value Pth at which stimulated Brillouin scattering occurs can be represented by equation (1) given below:

$$Pth = \frac{21}{Gb} \frac{Aeff}{Leff} \frac{\delta vb + \delta vs}{\delta vb}. \tag{1}$$

In Equation (1), Gb indicates a Brillouin gain coefficient of the highly-nonlinear optical fiber 134. The Brillouin gain coefficient Gb is about $5 \times 10^{-11}$ mW in molten quartz. δvb indicates a Brillouin gain. For example, the Brillouin gain δvb is about 100 MHz when the wavelength of light input to the highly-nonlinear optical fiber 134 is 1.55 μm.

δvs indicates the line width (spectral line width) of light input to the highly-nonlinear optical fiber 134. For example, the line width δvs of light output from a DFB-LD that is generally used in a WDM optical transmission system is about several megahertz. Constant 21 indicates an approximate value determined depending on the line width δvs. Aeff indicates the effective core cross-sectional area of the highly-nonlinear optical fiber 134. The effective core cross-sectional area Aeff is a function of the mode field diameter MFD of the highly-nonlinear optical fiber 134, and can be represented by Equation (2) given below:

$$Aeff = \pi(MFD/2)^2 \tag{2}$$

In Equation (1), Leff indicates the effective fiber length of the highly-nonlinear optical fiber 134. The effective fiber length Leff can be represented by Equation (3) given below:

$$Leff = \{1 - \exp(-\alpha L)\}/\alpha \tag{3}$$

In Equation (1), the threshold value Pth is calculated under the following conditions: Aeff=46.5 μm²; MFD=7.7 μm; Leff=7846 m; L=10000 m; α=$5.1 \times 10^{-5}$/m: 0.22 dB/km; Gb=$5 \times 10^{-11}$ m/W; δvb=100 MHz; and δvs=1 MHz. As a result, the threshold value Pth is 2.7 mW.

Figure 6:
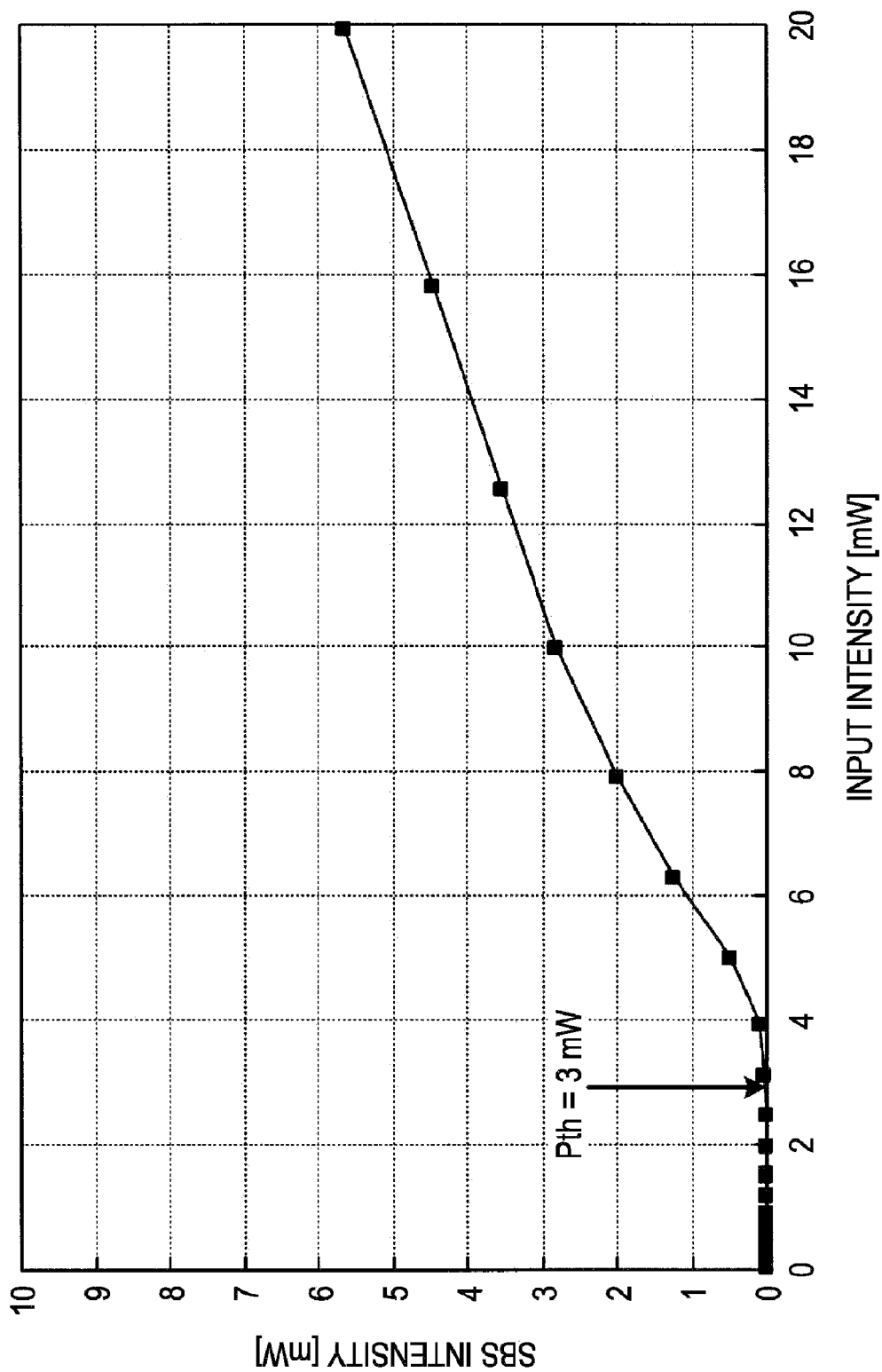
FIG. 6 is a diagram illustrating the relationship between the intensity of input light and the stimulated Brillouin scattering.

FIG. 6 is a diagram illustrating a relationship between the intensity of input light and stimulated Brillouin scattering. In FIG. 6, the horizontal axis indicates the intensity (input intensity) [mW] of light input to the highly-nonlinear optical fiber 134, and the vertical axis indicates the intensity (SBS intensity) [mW] of stimulated Brillouin scattering occurring in the highly-nonlinear optical fiber 134. FIG. 6 shows the experimental results when a 10-km DSF (dispersion shifted fiber) is used.

As illustrated in FIG. 6, the threshold value Pth is about 3 mW, and is substantially equal to the threshold value Pth (2.7 mW) calculated by Equation (1). It is possible to prevent the occurrence of stimulated Brillouin scattering by increasing the threshold value Pth. In Equation (1), it is difficult to adjust the Brillouin gain coefficient Gb since the Brillouin gain coefficient Gb is a parameter depending on a material forming the optical fiber.

The effective core cross-sectional area Aeff and the effective fiber length Leff are parameters that have an effect on the gain efficiency of the lumped Raman amplifier 130, and it is not preferable to increase these parameters. It is difficult to adjust the Brillouin gain δvb since the Brillouin gain δvb is a parameter depending on the signal wavelength of an optical transmission system. In the optical amplifier 100, in Equation (1), the threshold value Pth is increased by increasing the line width δvs of light input to the highly-nonlinear optical fiber 134.

For example, the intensity of light that is generally used in a CWDM system is in the range of about 0 to 5 dBm in CWDM transmission using SFP. The intensity of light input to the lumped Raman amplifier 130 is in the range of about −5 to 0 dBm, considering an optical component loss. This value is obtained when the optical component loss of an AWG (arrayed waveguide grating) is in the range of 4 to 6 dB and the optical component loss of each of the optical multiplexer and the optical demultiplexer is 3 dB.

When the intensity of light input to the lumped Raman amplifier 130 is in the range of about −5 to 0 dBm, the threshold value Pth may be 0 dBm or more. If the mode field diameter MFD of the highly-nonlinear optical fiber 134 is 4 μm, L is 10000 m, and the loss thereof is 0.5 dB/km, the threshold value Pth when light input to the lumped Raman amplifier 130 is not modulated is −0.5 dBm.

When light input to the lumped Raman amplifier 130 is modulated at 50 MHz or more, the threshold value Pth is 1.2 dBm, and it is possible to sufficiently increase the threshold value Pth of the intensity of light input to the lumped Raman amplifier 130. Therefore, it is preferable that the modulator 120 modulate light output from the LD 110 at 50 MHz or more. The modulation of light at 50 MHz or more corresponds to increasing the threshold value Pth by 1.5 times.

Figure 7:
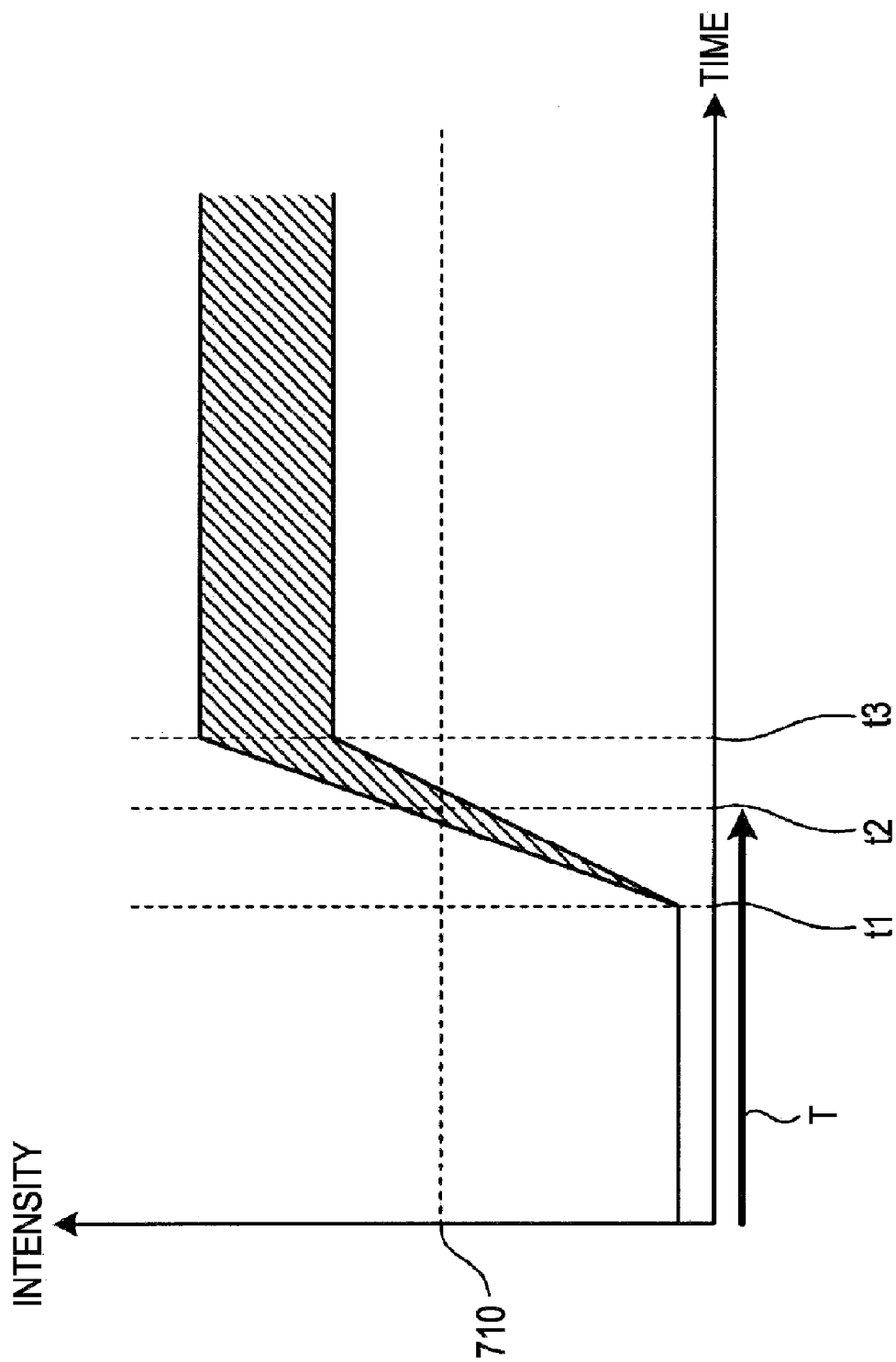
FIG. 7 is a diagram illustrating an example of the driving control timing of a controller illustrated in FIG. 1.

FIG. 7 is a diagram illustrating an example of the driving control timing of the controller illustrated in FIG. 1. In FIG. 7, the horizontal axis indicates time, and the vertical axis indicates the intensity of light propagating through the lumped Raman amplifier 130. Reference numeral 710 denotes the threshold value (which corresponds to the threshold value 411 of FIG. 4) of the intensity of light at which stimulated Brillouin scattering occurs when light that is not modulated is input to the lumped Raman amplifier 130. In this embodiment, a case will be described in which the input of a modulation signal to the modulator 120 starts at the same time as the controller 141 starts the supply of driving power to the LD 110.

The controller 141 starts the supply of driving power to the LD 110 at a time t1. The driving power supplied to the LD 110 is increased at a time t2, and the intensity (average intensity) of light propagating through the lumped Raman amplifier 130 reaches the threshold value 710. The driving power supplied to the LD 110 by the controller 141 is increased up to an operation level at a time t3, and the intensity of light is stabilized.

The controller 141 gradually increases the driving power supplied to the LD 110 from the time t1 to the time t3. The controller 141 starts the supply of driving power at the time t1, and inputs a modulation signal to the modulator 120. In this way, light is modulated at the same time as it is output from the LD 110. Therefore, before the intensity of light propagating through the lumped Raman amplifier 130 reaches the threshold value 710, the light is modulated. Therefore, it is possible to increase the line width.

In this embodiment, the modulation signal is input to the modulator 120 at the time t1. However, the modulation signal may be input before the time t1. In this case, light is modulated at the same time as it is output from the LD 110. Therefore, before the intensity of light propagating through the lumped Raman amplifier 130 reaches the threshold value 710, the light is modulated, and it is possible to increase the line width. When the input of the modulation signal starts before the time t1, the controller 141 does not need to perform determination for the threshold value 710. Therefore, the memory 150 may be omitted in the optical amplifier 100.

In addition, the input of the modulation signal may start after the time t1 and before the time t2. In this case, the light is modulated before the intensity of light propagating through the lumped Raman amplifier 130 reaches the threshold value. Therefore, the light is modulated before the intensity of light propagating through the lumped Raman amplifier 130 reaches the threshold value 710, and it is possible to increase the line width. That is, the controller 141 starts the input of the modulation signal during a period T immediately before the time t2.

In this way, the line width of light is increased before the intensity of light propagating through the lumped Raman amplifier 130 reaches the threshold value 710, and it is possible to increase the threshold value 710. Therefore, it is possible to prevent the occurrence of stimulated Brillouin scattering. In addition, there is a time lag between the output of the modulation signal from the controller 141 to the modulator 120 and a sufficient increase in the line width of light. Therefore, it is preferable that the input of the modulation signal start at a time that is sufficiently earlier than the time t2, considering the time lag.

Figure 8:
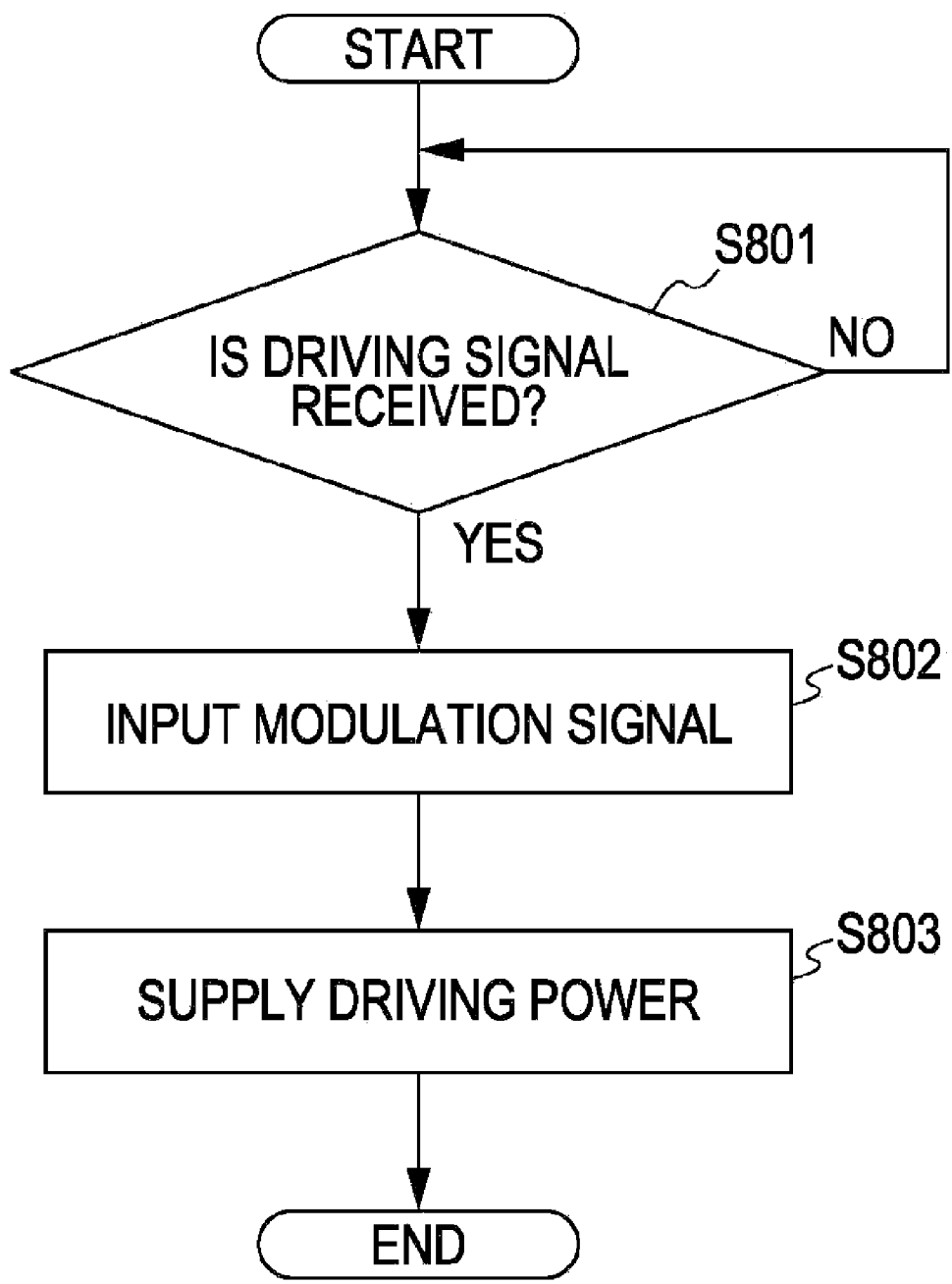
FIG. 8 is a flowchart illustrating an example of a driving control operation illustrated in FIG. 7.

FIG. 8 is a flowchart illustrating an example of the driving control operation illustrated in FIG. 7. As illustrated in FIG. 8, first, the controller 141 determines whether a driving signal for driving the LD 110 is received from the outside (Operation S801), and waits for the reception of the driving signal (Operation S801: loop of No). When receiving the driving signal (Operation S801: Yes), the controller inputs a modulation signal to the modulator 120 (Operation S802).

Then, the controller supplies driving power to the LD 110 (Operation S803), and ends a series of processes. These processes make it possible to modulate light at the same time as the light is output from the LD 110. In this embodiment, after Operation S802, Operation S803 is performed. However, Operation S802 and Operation S803 may be performed at the same time.

Figure 9:
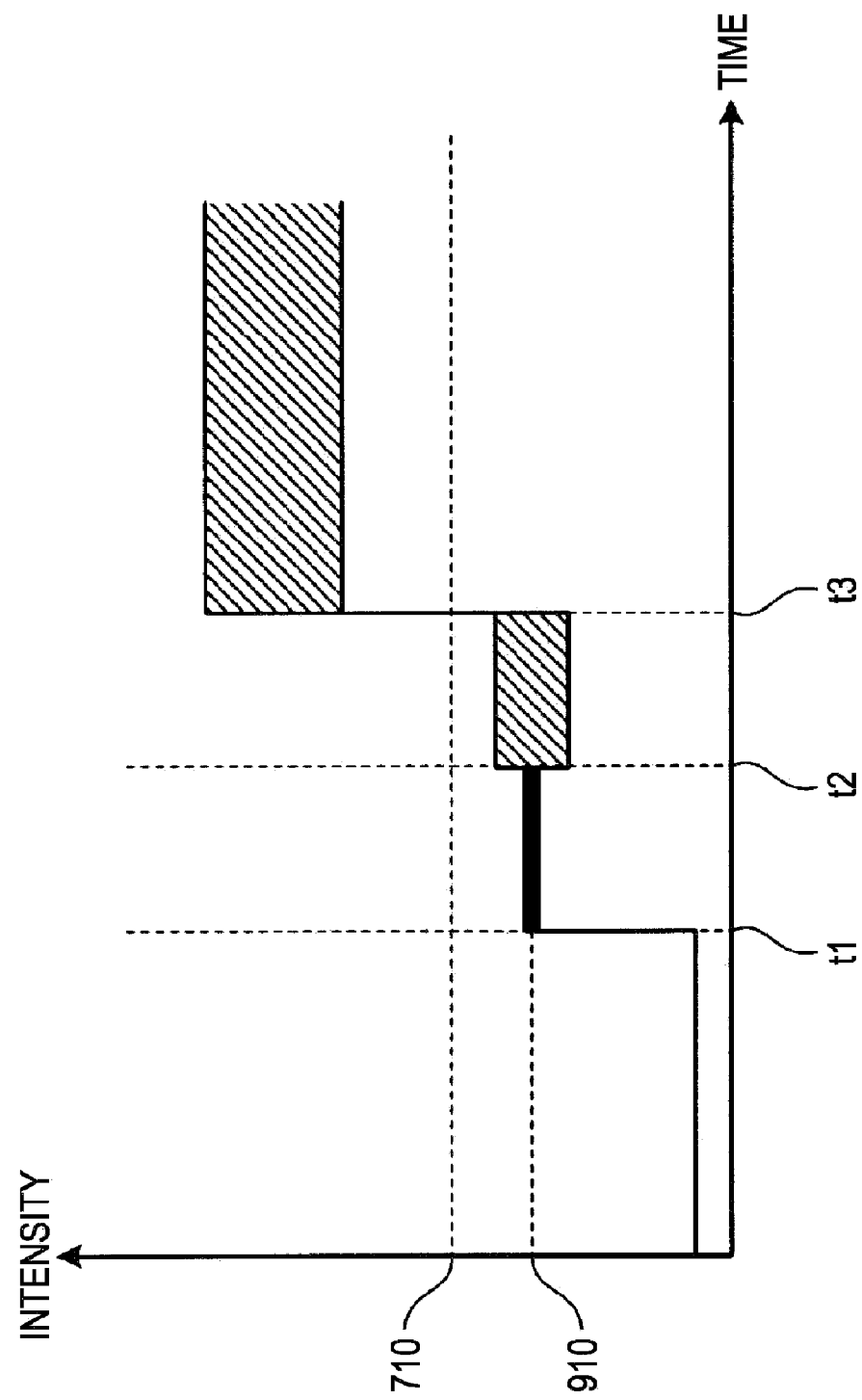
FIG. 9 is a diagram illustrating another example of the driving control timing of the controller illustrated in FIG. 1.

FIG. 9 is a diagram illustrating another example of the driving control timing of the controller illustrated in FIG. 1. In FIG. 9, the same components as those illustrated in FIG. 7 are denoted by the same reference numerals, and a description thereof will be omitted. Next, a case will be described in which the controller 141 starts the supply of driving power to the LD 110 and then starts the input of a modulation signal to the modulator 120 before the intensity of light propagating through the lumped Raman amplifier 130 reaches the threshold value 710.

The controller 141 starts the supply of driving power to the LD 110 at a time t1. The controller 141 starts the input of the modulation signal to the modulator 120 at a time t2. The controller 141 increases the driving power supplied to the LD 110 up to an operation level at a time t3.

The controller 141 starts the supply of driving power to the LD 110 at the time t1. The intensity 910 of light that is generated by the driving power and propagates through the lumped Raman amplifier 130 is lower than the threshold value 710 at the time t1. Then, the controller 141 starts the input of the modulation signal to the modulator 120 at the time t2.

Then, the controller 141 increases the driving power supplied to the LD 110 up to the operation level at the time t3. In this way, the light is modulated before the intensity of light propagating through the lumped Raman amplifier 130 reaches the threshold value 710, and the line width is increased. Therefore, it is possible to increase the threshold value 710. As a result, it is possible to prevent the occurrence of stimulated Brillouin scattering.

Figure 10:
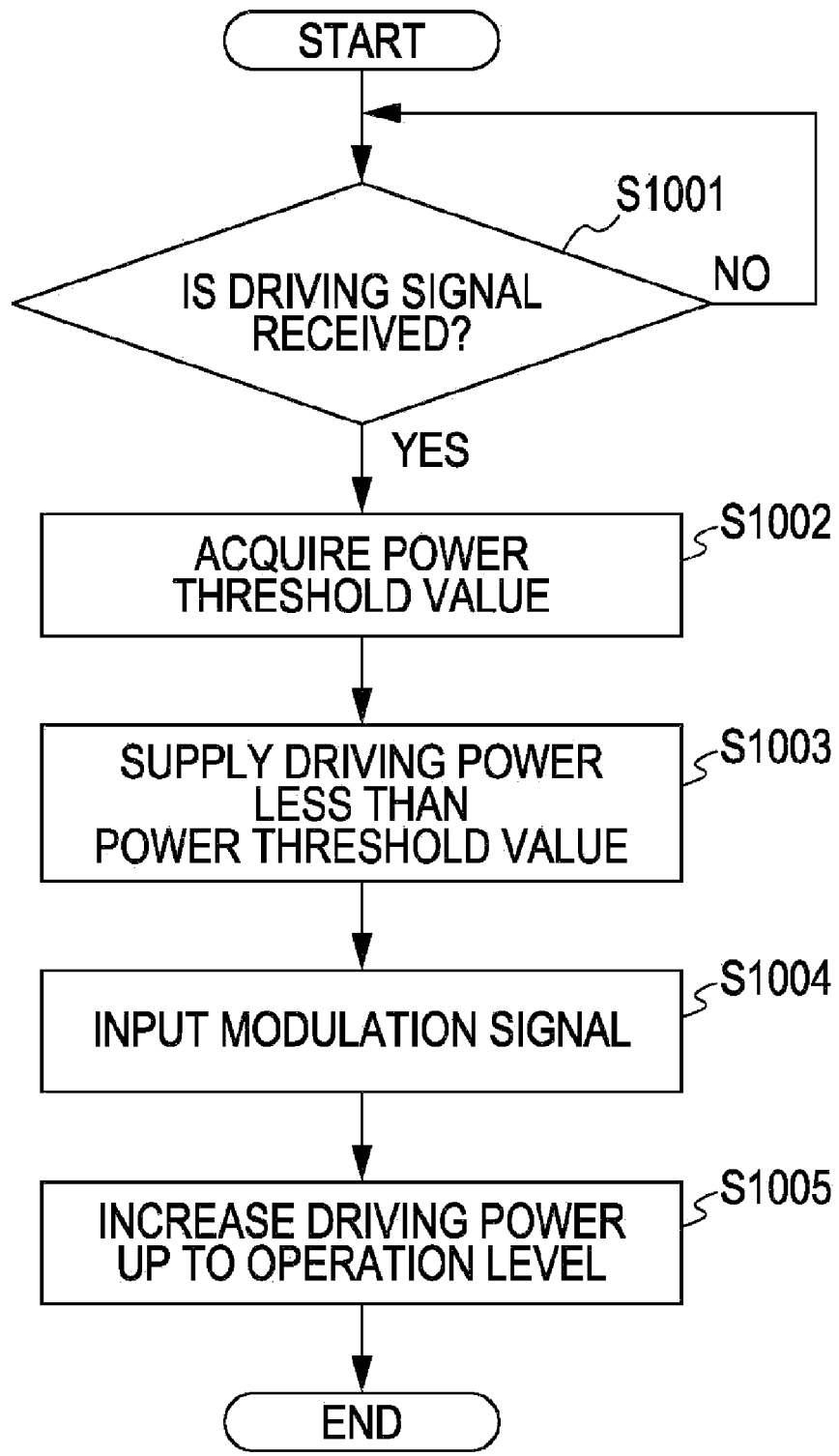
FIG. 10 is a flowchart illustrating an example of a driving control operation illustrated in FIG. 9.

FIG. 10 is a flowchart illustrating an example of the driving control operation illustrated in FIG. 9. As illustrated in FIG. 10, first, the controller determines whether a driving signal for driving the LD 110 is received from the outside (Operation S1001), and waits for the reception of the driving signal (Operation S1001: loop of No). When receiving the driving signal (Operation S1001: Yes), the controller acquires the power threshold value stored in the memory 150 (Operation S1002).

Then, the controller supplies a driving power that is less than the power threshold value acquired in Operation S1002 to the LD 110 (Operation S1003). Then, the controller inputs a modulation signal to the modulator 120 (Operation S1004). Then, the controller increases the driving power supplied to the LD 110 up to the operation level (Operation S1005), and then ends a series of processes.

Figure 11:
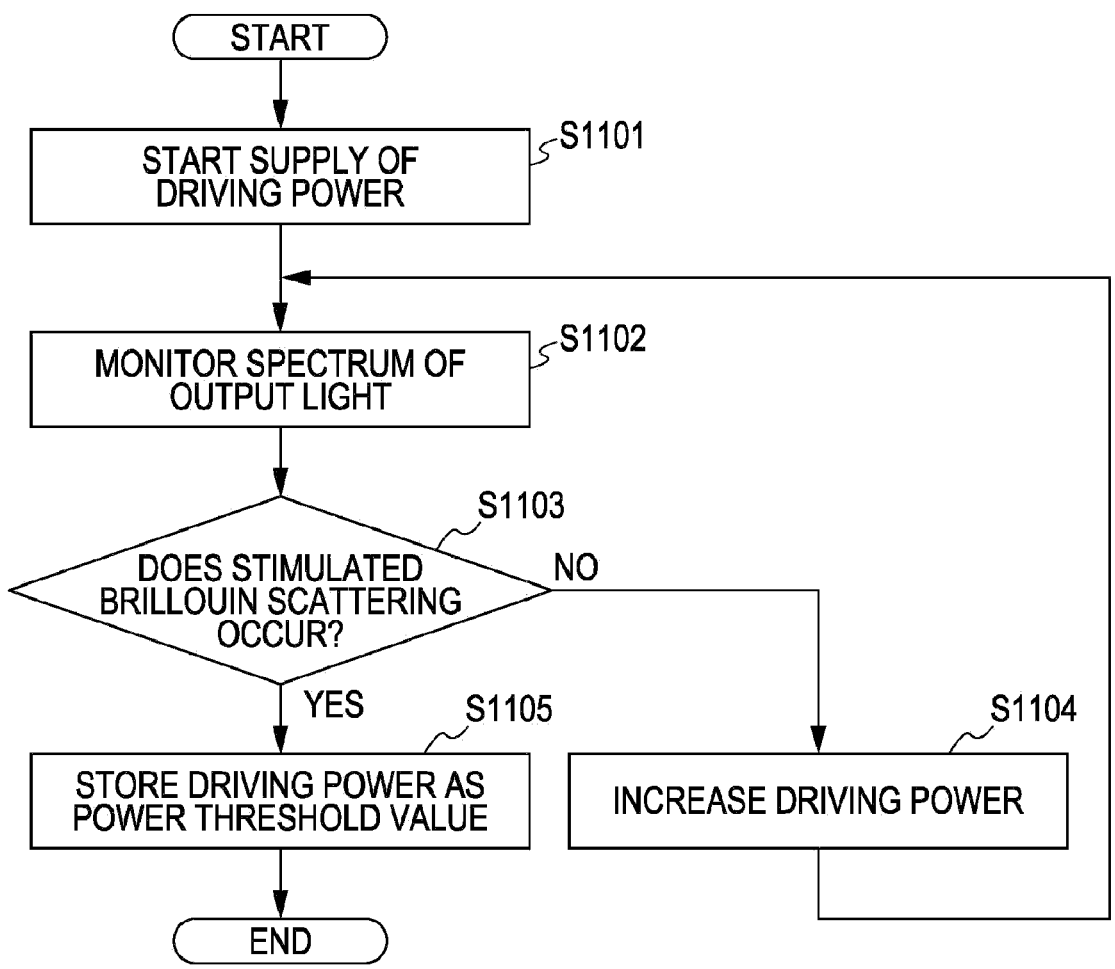
FIG. 11 is a flowchart illustrating an example of an operation of acquiring a power threshold value in advance.

FIG. 11 is a flowchart illustrating an example of an operation of acquiring a power threshold value in advance. Although not shown in the drawings, a spectrum monitor is provided in the rear stage of the lumped Raman amplifier 130, and the controller 141 performs the following processes. First, the controller starts the supply of driving power to the LD 110 (Operation S101). In this case, the driving power supplied to the LD 110 is sufficiently low not to generate stimulated Brillouin scattering in the lumped Raman amplifier 130.

Then, the spectrum monitor provided in the rear stage of the lumped Raman amplifier 130 monitors the spectrum of light output from the lumped Raman amplifier 130 (Operation S1102). Then, the controller determines whether stimulated Brillouin scattering occurs in the lumped Raman amplifier 130 on the basis of the spectrum monitored in Operation S1102 (Operation S1103).

If it is determined in Operation S1103 that no stimulated Brillouin scattering occurs (Operation S1103: No), the controller increases a variation in the driving power supplied to the LD 110 (Operation S1104), and returns to Operation S1102. If it is determined that stimulated Brillouin scattering occurs (Operation S1103: Yes), the controller stores the driving power supplied to the LD 110 at that time as a power threshold value in the memory 150 (Operation S1105), and then ends a series of processes.

As such, according to the optical amplifier 100 according to the first embodiment, before stimulated Brillouin scattering occurs in the lumped Raman amplifier 130, light input to the lumped Raman amplifier 130 is modulated, and it is possible to increase the line width. Therefore, even when the generation conditions (threshold value 710) of stimulated Brillouin scattering are changed and the intensity of light output from the LD 110 is increased up to the operation level, no stimulated Brillouin scattering occurs.

Therefore, for example, in the WDM system, it is possible to prevent the occurrence of crosstalk in other signals due to the stimulated Brillouin scattering, and stably operate the WDM system. In addition, it is possible to prevent the occurrence of stimulated Brillouin scattering. Therefore, even when a channel is added to the shorter wavelength side of the channel that is in service, no crosstalk occurs in other signal light components. As a result, it is possible to easily and flexibly increase the number of channels.

In addition, the controller 141 starts the input of a modulation signal before starting the supply of driving power to the LD 110. Therefore, the controller 141 does not need to perform determination for the threshold value 710. As a result, it is possible to prevent the occurrence of stimulated Brillouin scattering with a simple control operation. In addition, the controller 141 starts the supply of driving power to the LD 110, and then starts the input of a modulation signal before the intensity of light propagating through the lumped Raman amplifier 130 reaches the threshold value 710. Therefore, it is possible to prevent the occurrence of stimulated Brillouin scattering while controlling the driving time of the modulator 120.

Specifically, the controller inputs a modulation signal before the driving power supplied to the LD 110 is greater than the power threshold value stored in the memory 150 beforehand. Therefore, it is possible to prevent the occurrence of stimulated Brillouin scattering with a simple control operation. In addition, the controller acquires light output from the lumped Raman amplifier 130 while increasing the driving power supplied to the LD 110, and stores the driving power when stimulated Brillouin scattering occurs in the acquired output light as the power threshold value in the memory 150. In this way, it is possible to store the power threshold value in the memory 150 in advance.

Figure 12:
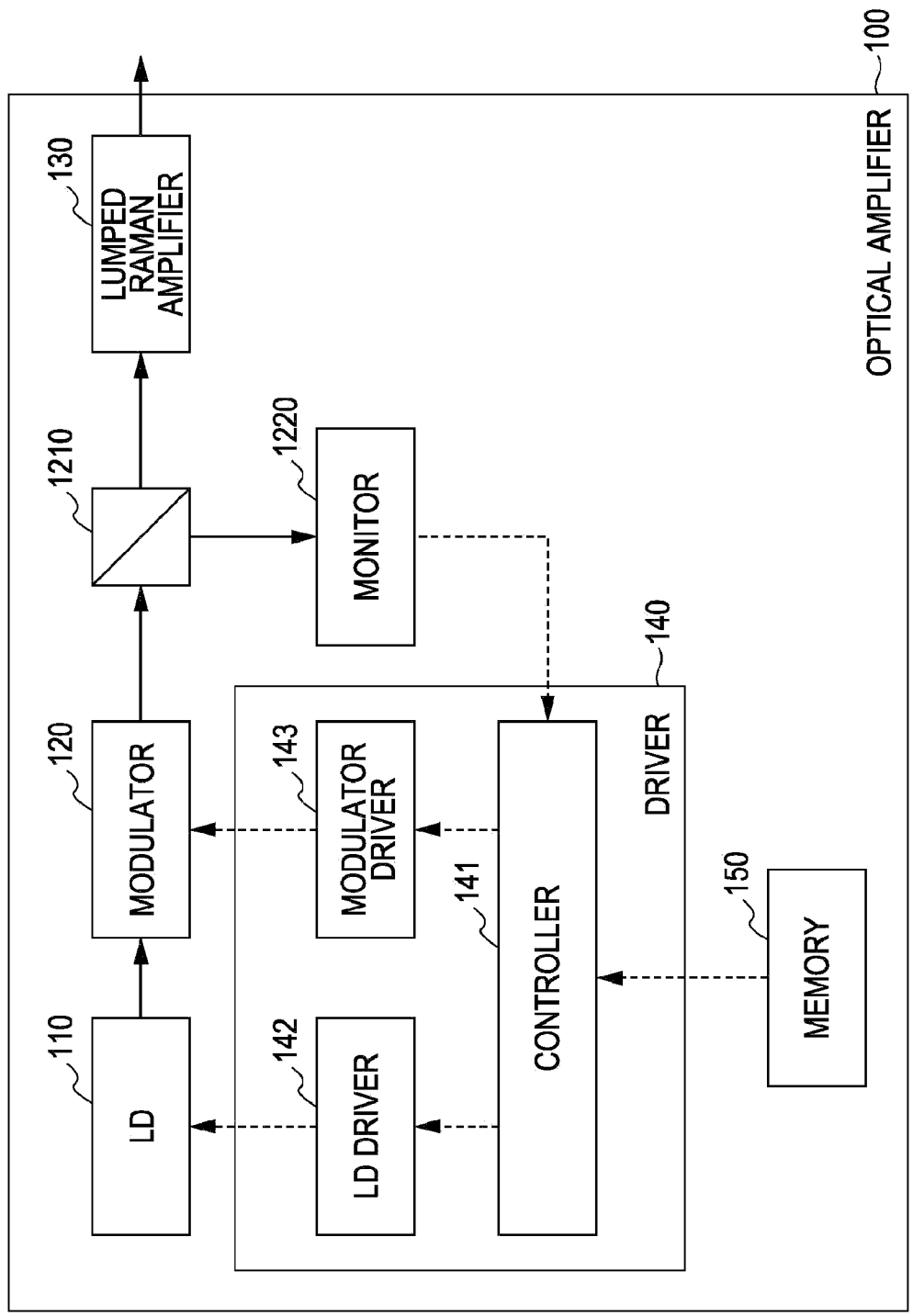
FIG. 12 is a diagram illustrating an optical amplifier according to a second embodiment.

FIG. 12 is a diagram illustrating an optical amplifier according to a second embodiment. In FIG. 12, the same components as those illustrated in FIG. 1 are denoted by the same reference numerals, and a description thereof will be omitted. As illustrated in FIG. 12, an optical amplifier 100 according to the second embodiment includes an optical demultiplexer 1210 that is provided between the modulator 120 and the lumped Raman amplifier 130 and a monitor 1220, in addition to the components of the optical amplifier 100 according to the first embodiment.

The optical demultiplexer 1210 branches a portion of light that is output from the modulator 120 and then input to the lumped Raman amplifier 130 and outputs it to the monitor 1220. The monitor 1220 is a monitor that monitors the intensity of light output from the optical demultiplexer 1210. The monitor 1220 is, for example, a PD (photodiode). The monitor 1220 outputs a signal indicating the intensity of light output from the optical demultiplexer 1210 to the driver 140.

The controller 141 of the driver 140 inputs a modulation signal to the modulator 120 before the intensity indicated by the signal output from the monitor 1220 exceeds an intensity threshold value at which stimulated Brillouin scattering occurs in the lumped Raman amplifier 130. The intensity threshold value at which stimulated Brillouin scattering occurs is stored in the memory 150 in advance, and the controller 141 reads the intensity threshold value from the memory 150 to use it.

Figure 13:
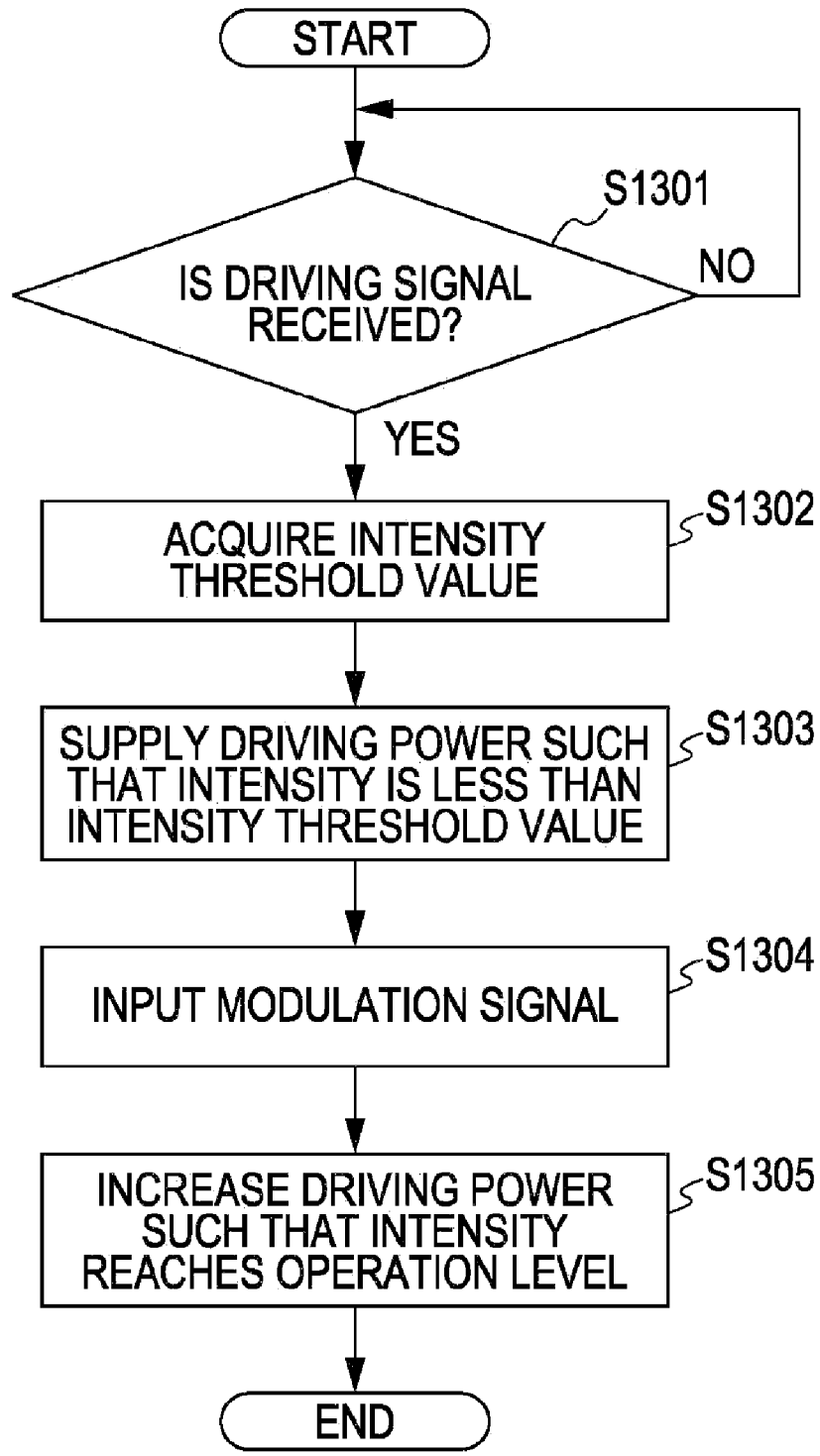
FIG. 13 is a flowchart illustrating an example of a driving control operation of a controller illustrated in FIG. 12.

FIG. 13 is a flowchart illustrating an example of the driving control operation of the controller illustrated in FIG. 12. As illustrated in FIG. 13, first, the controller determines whether a driving signal for driving the LD 110 is received from the outside (Operation S1301), and waits for the reception of the driving signal (Operation S1301: loop of No). When receiving the driving signal (Operation S1301: Yes), the controller acquires the intensity threshold value stored in the memory 150 (Operation S1302).

Then, the controller supplies driving power to the LD 110 such that the intensity indicated by the signal output from the monitor 1220 is less than the power threshold value acquired in Operation S1302 (the intensity 910 of FIG. 9) (Operation S1303). Then, the controller inputs a modulation signal to the modulator 120 (Operation S1304). Then, the controller increases the driving power such that the intensity indicated by the signal output from the monitor 1220 reaches the operation level (Operation S1305), and then ends a series of processes.

Figure 14:
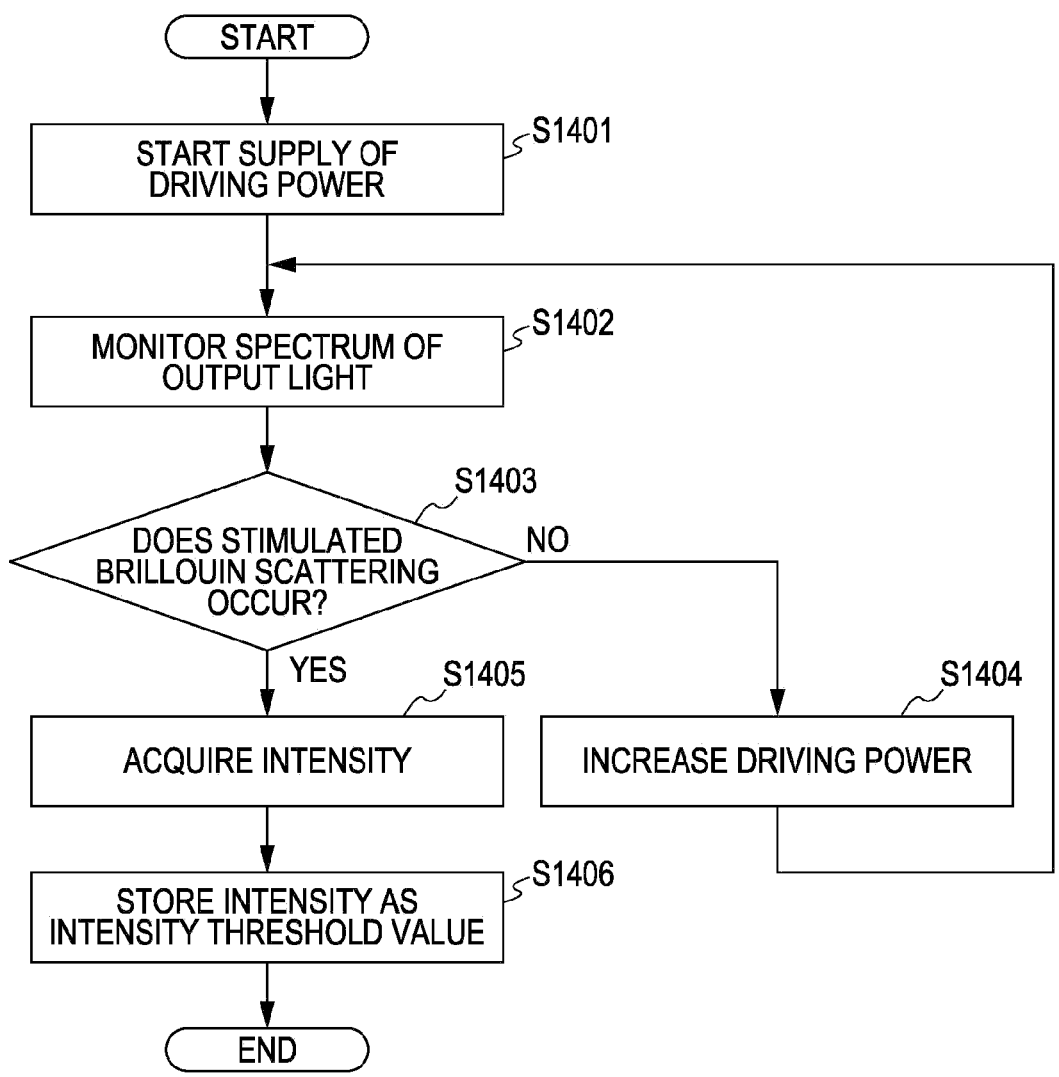
FIG. 14 is a flowchart illustrating an example of an operation of acquiring an intensity threshold value in advance.

FIG. 14 is a flowchart illustrating an example of an operation of acquiring an intensity threshold value in advance. Similarly to FIG. 11, a spectrum monitor is provided in the rear stage of the lumped Raman amplifier 130, and the controller 141 performs the following processes. Operations S1401 to S1404 illustrated in FIG. 14 are the same as Operations S1101 to S1104 illustrated in FIG. 11, and thus a description thereof will be omitted.

When stimulated Brillouin scattering occurs in Operation S1403 (Operation S1403: Yes), the controller acquires the intensity indicated by the signal output from the monitor 1220 (Operation S1405). Then, the controller stores the intensity acquired in Operation S1405 as an intensity threshold value in the memory 150 (Operation S1406), and then ends a series of processes.

As such, according to the optical amplifier 100 according to the second embodiment, as in the optical amplifier 100 according to the first embodiment, it is possible to prevent the occurrence of stimulated Brillouin scattering. In addition, before the intensity monitored by the monitor 1220 exceeds the intensity threshold value stored in the memory 150 in advance, the controller inputs a modulation signal. Therefore, it is possible to prevent the occurrence of stimulated Brillouin scattering with a simple control operation.

In addition, the controller acquires light output from the lumped Raman amplifier 130 while increasing the driving power supplied to the LD 110. Then, the controller acquires the intensity indicated by the signal output from the monitor 1220 when stimulated Brillouin scattering occurs in the acquired output light, and stores the acquired intensity as the intensity threshold value in the memory 150. In this way, the controller can store the intensity threshold value in the memory 150 in advance.

Figure 15:
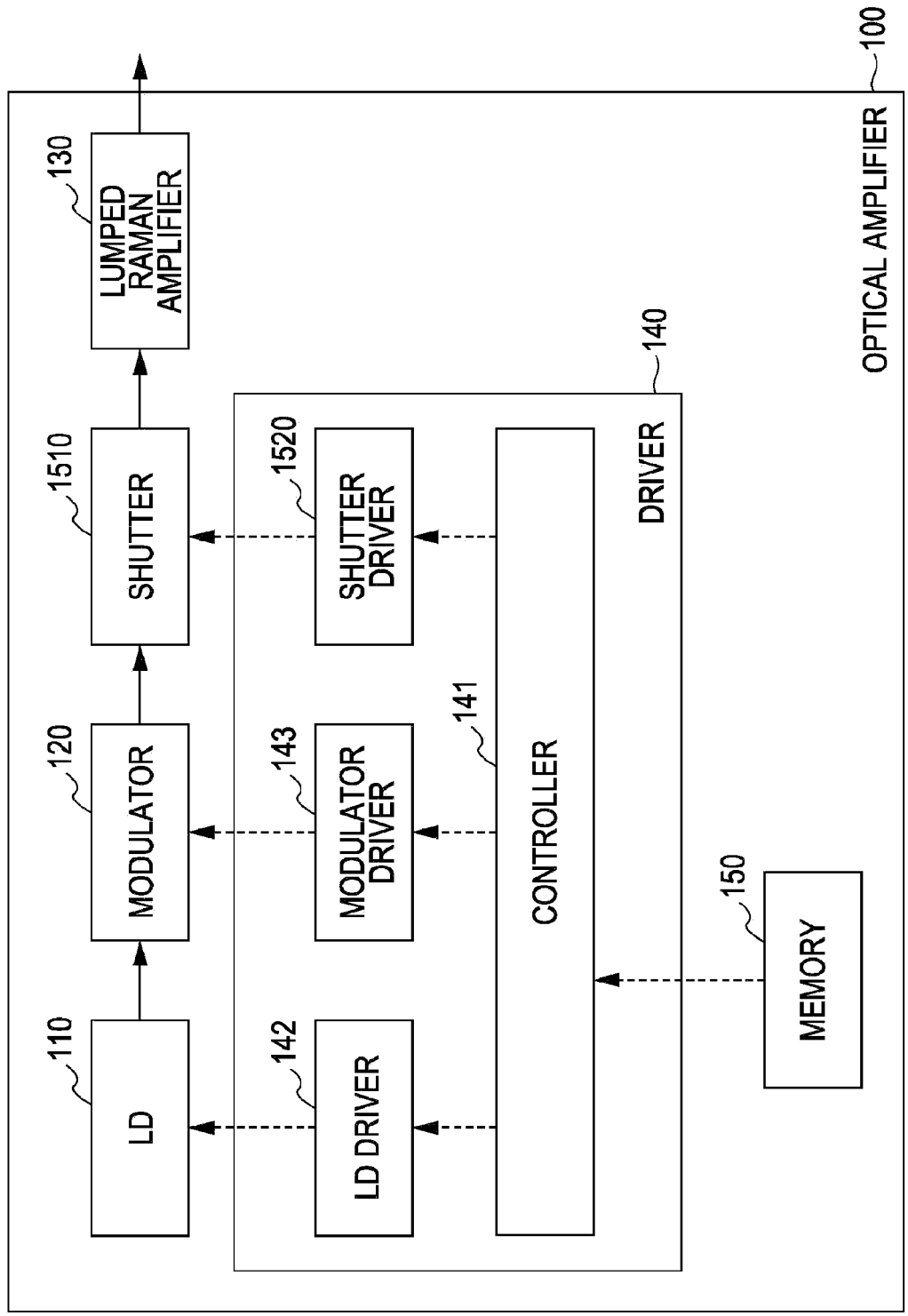
FIG. 15 is a diagram illustrating an optical amplifier according to a third embodiment.

FIG. 15 is a diagram illustrating an optical amplifier according to a third embodiment. In FIG. 15, the same components as those illustrated in FIG. 1 are denoted by the same reference numerals, and a description thereof will be omitted. As illustrated in FIG. 15, an optical amplifier 100 according to the third embodiment includes a shutter 1510 that is provided between the modulator 120 and the lumped Raman amplifier 130, in addition to the components of the optical amplifier 100 according to the first embodiment.

The shutter 1510 rejects or transmits light output from the modulator 120 to the lumped Raman amplifier 130 in response to a signal input from the driver 140. The driver 140 includes a shutter driver 1520. The controller 141 inputs a signal to the shutter 1510 through the shutter driver 1520 to control the opening or closing of the shutter 1510.

The shutter driver 1520 is, for example, a DA converter that converts a digital signal output from the controller 141 into an analog signal and outputs the analog signal to the shutter 1510. The controller 141 inputs a signal for rejecting light to the shutter 1510 before a modulation signal is input to the modulator 120, and inputs a signal for transmitting light to the shutter 1510 after the modulation signal is input.

In this embodiment, the shutter 1510 is provided between the modulator 120 and the lumped Raman amplifier 130. However, the shutter 1510 may be provided at any position as long as it can reject or transmit light output from a light source to the lumped Raman amplifier 130. For example, the shutter 1510 may be provided between the LD 110 and the modulator 120.

As such, according to the optical amplifier 100 of the third embodiment, the driver 140 controls the shutter 1510 to reject light before a modulation signal is input and to transmit light after the modulation signal is input. Therefore, it is possible to prevent light that is not modulated from being input to the lumped Raman amplifier 130. In this way, before the intensity of light propagating through the lumped Raman amplifier 130 exceeds the threshold value 710, it is possible to modulate light input to the lumped Raman amplifier 130. As a result, it is possible to prevent the occurrence of stimulated Brillouin scattering.

Fourth Embodiment

Figure 16:
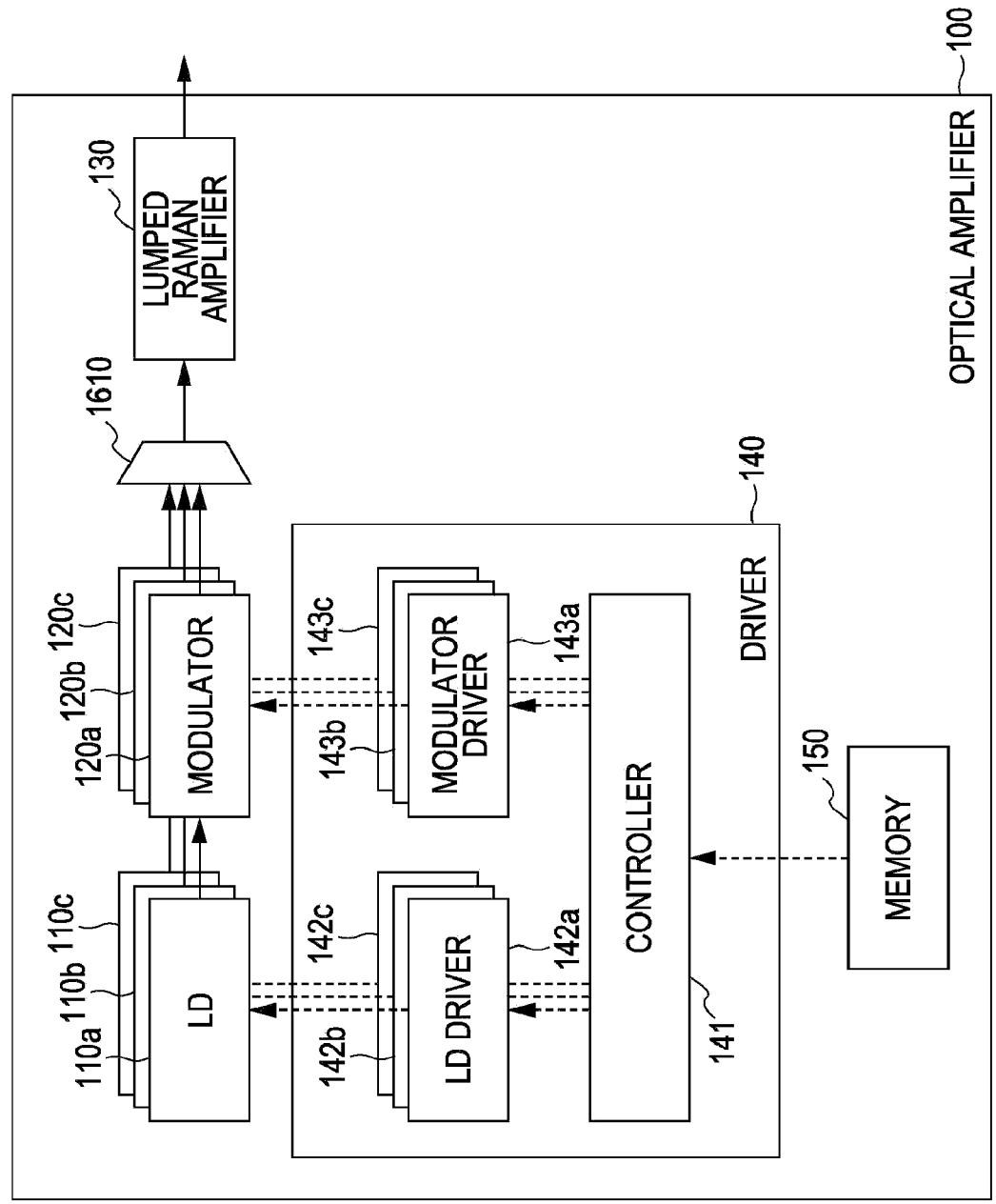
FIG. 16 is a diagram illustrating an optical amplifier according to a fourth embodiment of the invention.

FIG. 16 is a diagram illustrating an optical amplifier according to a fourth embodiment of the invention. In FIG. 16, the same components as those illustrated in FIG. 1 are denoted by the same reference numerals, and a description thereof will be omitted. As illustrated in FIG. 16, an optical amplifier 100 according to the fourth embodiment includes a multiplexing unit 1610, in addition to the components of the optical amplifier 100 according to the first embodiment. In addition, the optical amplifier 100 according to the fourth embodiment includes LDs 110a to 110c and modulators 120a to 120c, instead of the LD 110 and the modulator 120.

The LDs 110a to 110c are light sources that generate light components (continuous light) having different wavelengths and output the generated light components to the modulators 120a to 120c, respectively. The modulators 120a to 120c are provided to correspond to the LDs 110a to 110c. The modulators 120a to 120c modulate the light components output from the LDs 110a to 110c and output the modulated light components to the multiplexing unit 1610. The modulators 120a to 120c modulate the light components in response to modulation signals input from the driver 140.

The driver 140 includes LD drivers 142a to 142c and modulator drivers 143a to 143c, instead of the LD driver 142 and the modulator driver 143 illustrated in FIG. 1. The LD drivers 142a to 142c are provided to correspond to the LDs 110a to 110c, respectively. The modulator drivers 143a to 143c are provided to correspond to the modulators 120a to 120c, respectively.

The controller 141 supplies driving power to the LDs 110a to 110c through the LD drivers 142a to 142c to drive the LDs 110a to 110c. In addition, the controller 141 inputs modulation signals to the modulators 120a to 120c through the modulator drivers 143a to 143c to control the modulating operations of the modulators 120a to 120c. The multiplexing unit 1610 multiplexes the wavelengths of the light components output from the modulators 120a to 120c and outputs the multiplexed wavelength to the lumped Raman amplifier 130. The multiplexing unit 1610 is, for example, an AWG.

The lumped Raman amplifier 130 amplifies the wavelength-multiplexed light output from the multiplexing unit 1610. The pumping light source 132 and the pumping light source 135 of the lumped Raman amplifier 130 generate pumping light components having wavelengths corresponding to wavelength components included in the wavelength-multiplexed light that is output from the multiplexing unit 1610, and output the generated pumping light components. In this way, the lumped Raman amplifier 130 can perform Raman amplification on each of the wavelength components included in the wavelength-multiplexed light that is output from the multiplexing unit 1610.

Figure 17:
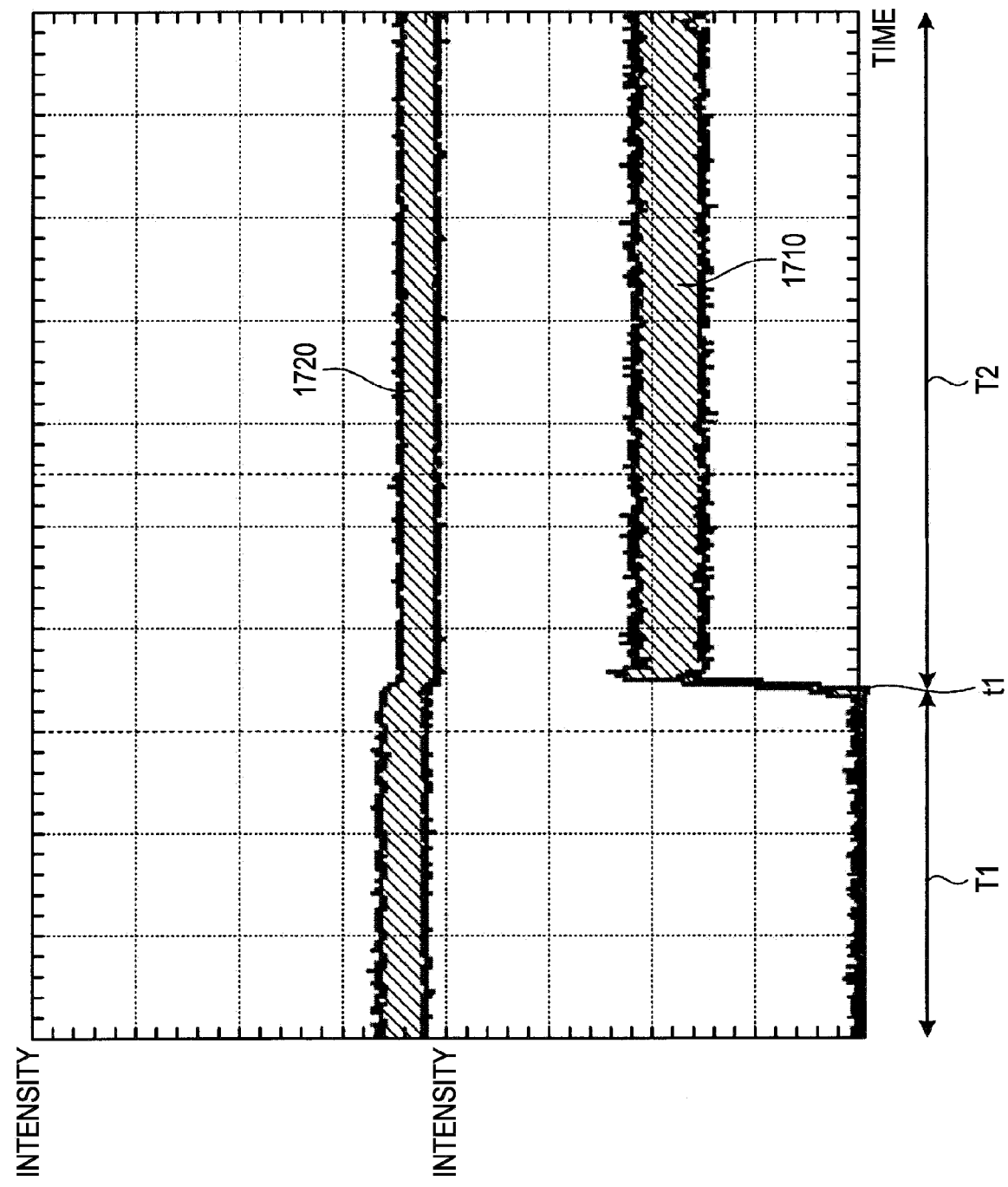
FIG. 17 is a diagram illustrating light output from a lumped Raman amplifier when a channel is added.
Figure 18:
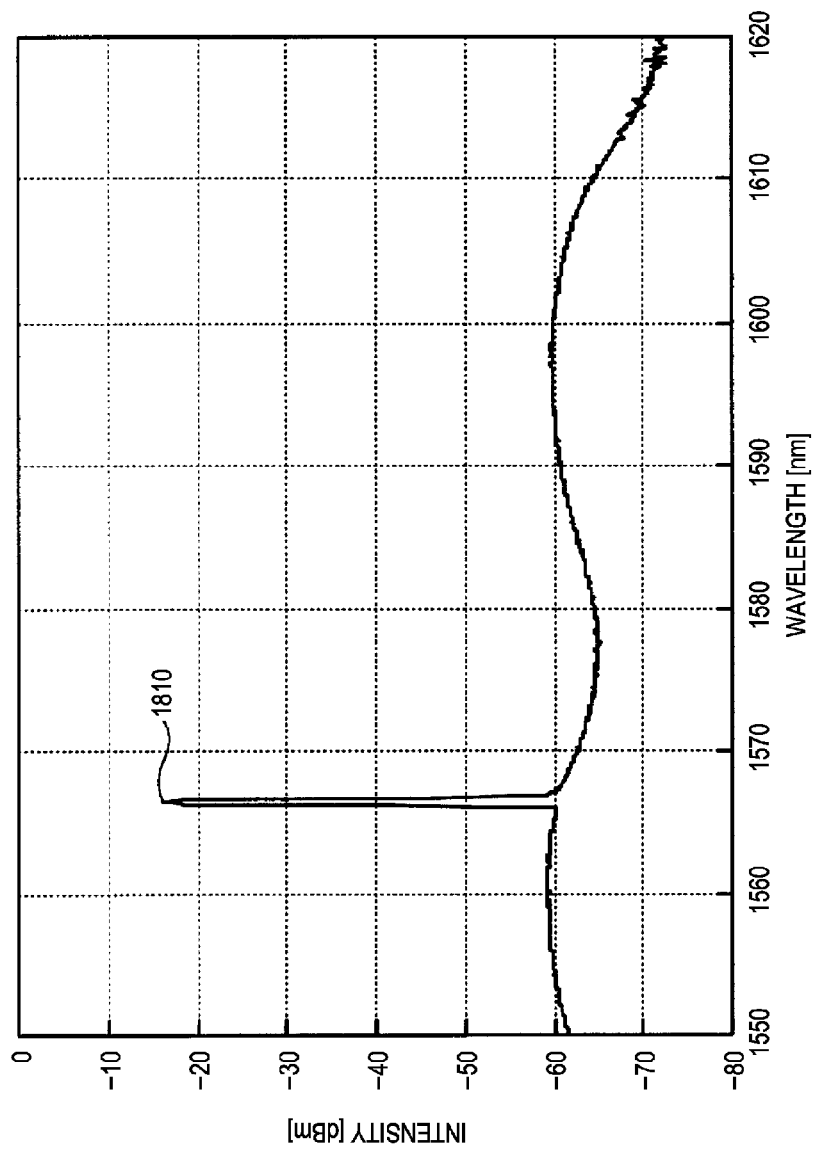
FIG. 18 is a diagram illustrating the spectrum of light output from the lumped Raman amplifier (when the intensity of input light is low)
Figure 19:
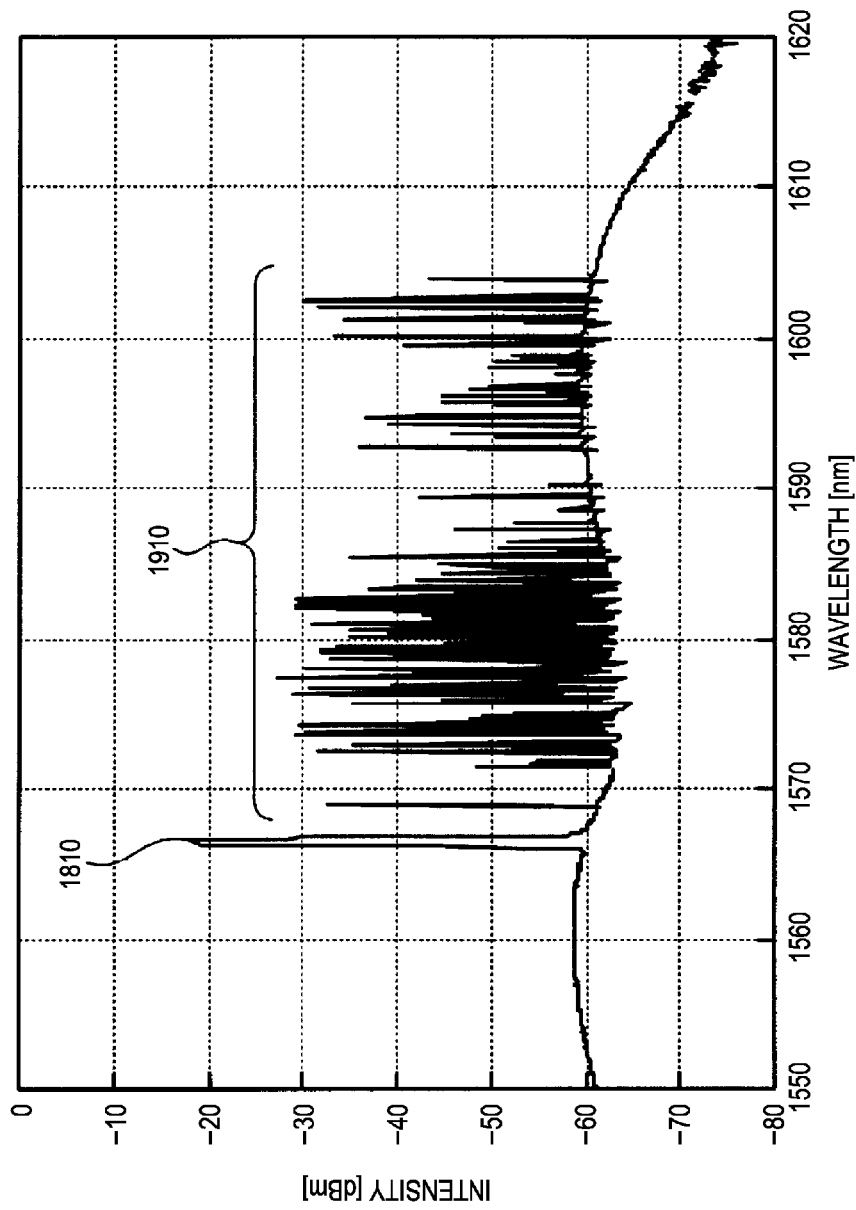
FIG. 19 is a diagram illustrating the spectrum of light output from the lumped Raman amplifier (when the intensity of input light is high)
Figure 20:
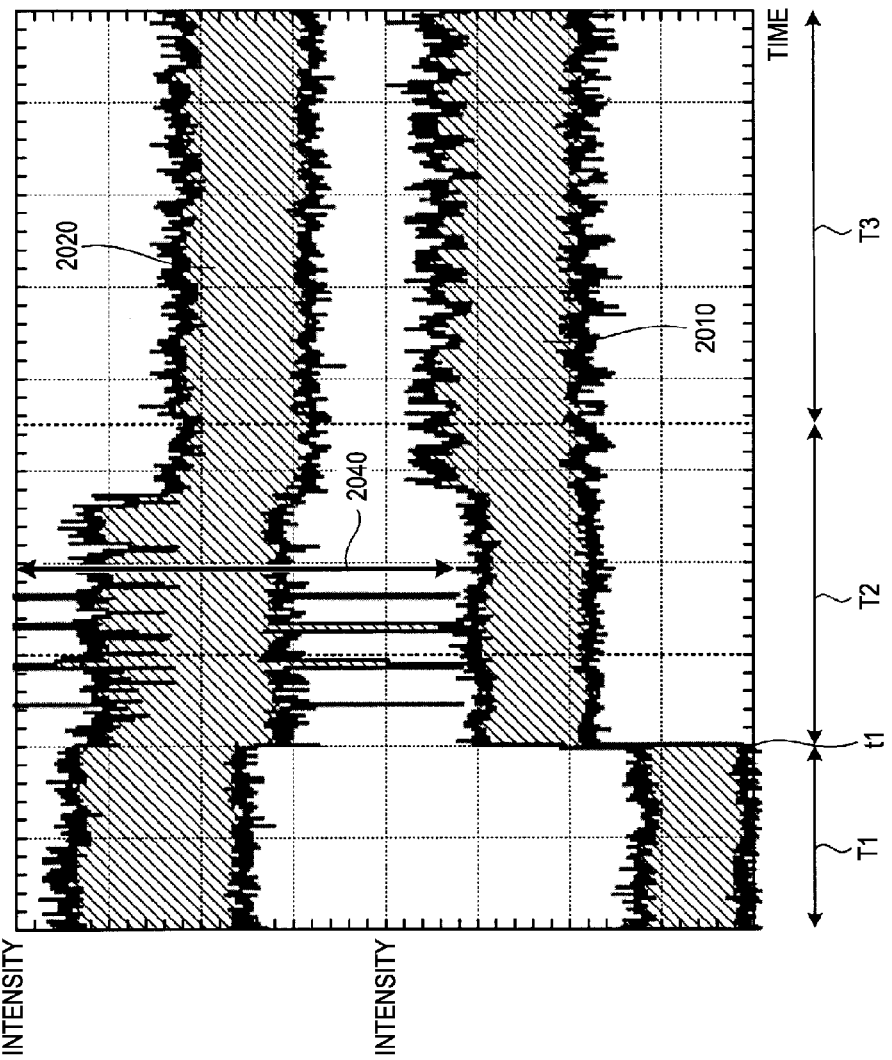
FIG. 20 is a diagram illustrating light output from the lumped Raman amplifier when a channel is added (part 1)

FIG. 17 is a diagram illustrating light output from the lumped Raman amplifier when a channel is added. In FIG. 17, the horizontal axis indicates time, and the vertical axis indicates the intensity of light. Reference numeral 1710 denotes light input to the lumped Raman amplifier 130. Reference numeral 1720 denotes light output from the lumped Raman amplifier 130. During a period T1, only the LD 110a (wavelength: 1530.8 nm) and the modulator 120a among the LDs 110a to 110c and the modulators 120a to 120c are driven.

Figure 21:
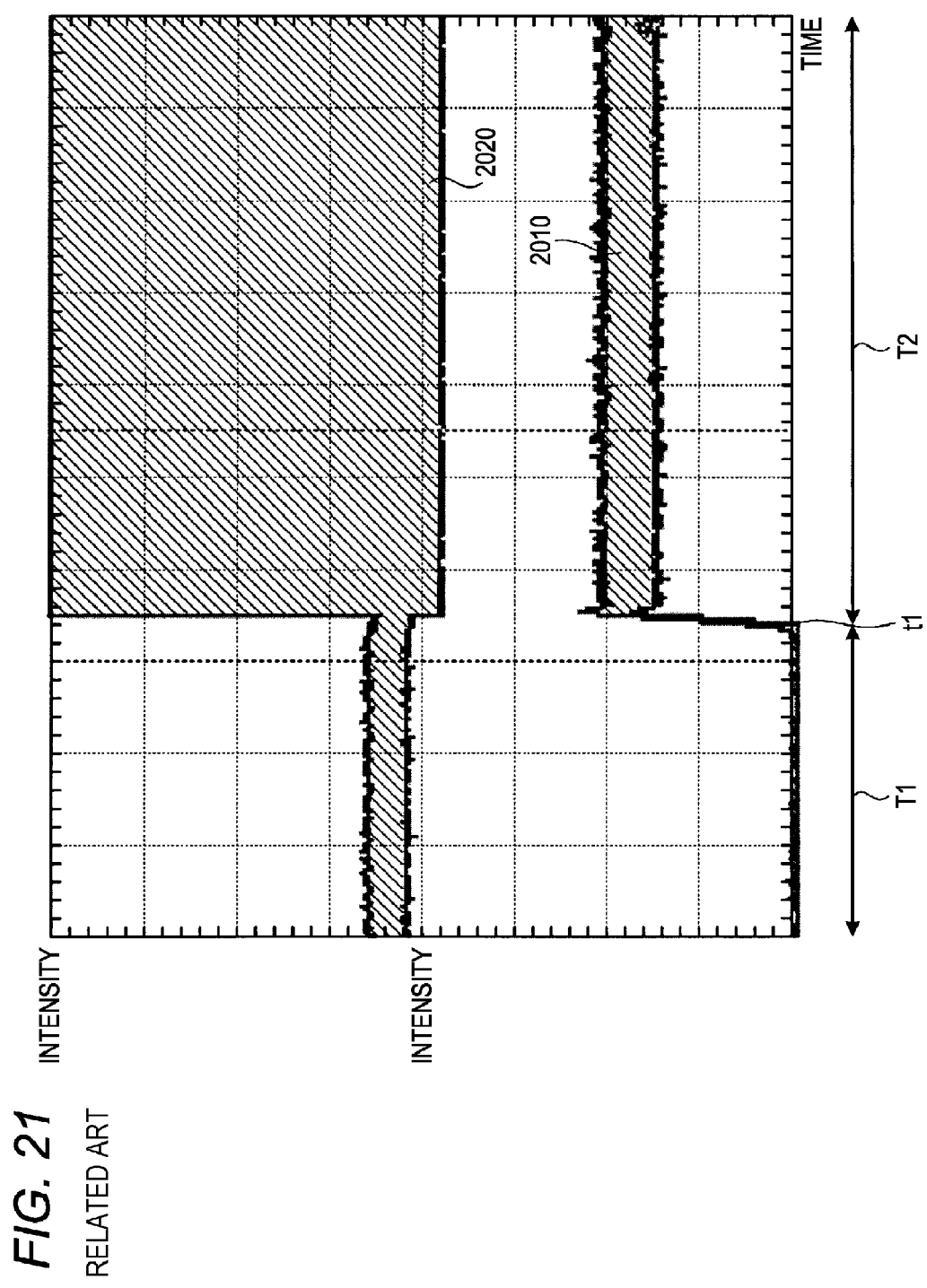
FIG. 21 is a diagram illustrating light output from the lumped Raman amplifier when a channel is added (part 2).

The LD 110b (wavelength: 1510 nm) and the modulator 120b are newly driven at a time t1 after the period T1. The LDs 110a and 110b and the modulators 120a and 120b are driven during a period T2 after the time t1. In the optical amplifier 100, even when the LD 110b and the modulator 120b are driven at the time t1, it is possible to prevent the occurrence of stimulated Brillouin scattering. Therefore, the output light 1720 is stabilized during the period T2 (which is compared with FIG. 21).

As such, according to the optical amplifier 100 of the fourth embodiment, it is possible to prevent the occurrence of stimulated Brillouin scattering in each of the wavelength components included in the light amplified by the optical amplifier 100 that is composed of a WDM system. Therefore, it is possible to prevent the occurrence of crosstalk in other signal light components due to stimulated Brillouin scattering, and stably operate the WDM system. In addition, it is possible to prevent the occurrence of stimulated Brillouin scattering. Therefore, even when a channel is added to the shorter wavelength side of the channel that is in service, no crosstalk occurs in other signal light components. As a result, it is possible to easily and flexibly increase the number of channels.

According to the optical amplifiers or the methods of driving the optical amplifier of the above-described embodiments, the occurrence of stimulated Brillouin scattering can be prevented. In addition, the amplifiers or the methods can also be applied to Raman amplification using a highly-nonlinear medium in a portion of a transmission path.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical amplifier comprising:
a light source that outputs light having an intensity corresponding to a supplied driving power;
a modulator that modulates the output light in response to an input modulation signal;
a Raman amplifier that performs Raman amplification on the modulated light using a nonlinear medium; and
a driver that supplies the driving power to drive the light source and inputs the modulation signal to the modulator, wherein
the driver starts inputting the modulation signal to the modulator before the driving power is supplied to the light source and before the intensity of the light propagating through the Raman amplifier exceeds an intensity value at which stimulated Brillouin scattering occurs in the Raman amplifier.

2. The optical amplifier according to claim 1,
wherein the driver starts inputting the modulation signal before the driving power supplied to the light source exceeds a threshold value at which the stimulated Brillouin scattering occurs in the Raman amplifier.

3. The optical amplifier according to claim 1, further comprising:
a monitor that monitors the intensity of the light input to the Raman amplifier,
wherein the driver starts inputting the modulation signal before the intensity monitored by the monitor exceeds a threshold value at which the stimulated Brillouin scattering occurs in the Raman amplifier.

4. The optical amplifier according to claim 2, further comprising:
a storage that stores the threshold value,
wherein the driver inputs the modulation signal on the basis of the threshold value stored in the storage.

5. The optical amplifier according to claim 4,
wherein the driver acquires light output from the Raman amplifier while increasing the driving power supplied to the light source, and stores the driving power when the stimulated Brillouin scattering occurs in the acquired output light as the threshold value in the storage.

6. The optical amplifier according to claim 4, further comprising:
a monitor that monitors the intensity of the light input to the Raman amplifier,
wherein the driver acquires light output from the Raman amplifier while increasing the driving power supplied to the light source, and stores as the threshold value the intensity monitored by the monitor when the stimulated Brillouin scattering occurs in the acquired output light in the storage.

7. The optical amplifier according to claim 1, further comprising:
a shutter that rejects or transmits the light output from the light source to the Raman amplifier in response to an input signal,
wherein the driver start inputting a signal for rejecting the light to the shutter before the modulation signal is input, and start inputting a signal for transmitting the light to the shutter after the modulation signal is input.

8. The optical amplifier according to claim 1,
wherein the Raman amplifier includes:
a highly-nonlinear optical medium that transmits the light modulated by the modulator; and
a pumping light source that inputs pumping light to the highly-nonlinear optical medium, and
the driver inputs the modulation signal before the intensity of the light input to the highly-nonlinear optical medium exceeds an intensity value at which the stimulated Brillouin scattering occurs in the highly-nonlinear optical medium.

9. The optical amplifier according to claim 1,
wherein the modulator modulates the light output from the light source at 50 MHz or more.

10. A method of driving an optical amplifier including a light source that outputs light having an intensity corresponding to a supplied driving power, a modulator that modulates the light output from the light source in response to an input modulation signal, a Raman amplifier that performs Raman amplification on the light modulated by the modulator using a highly-nonlinear medium, and a driver that supplies the driving power to drive the light source, the method comprising:
- inputting the modulation signal to the modulator before the driving power is supplied to the light source and before the intensity of the light propagating through the Raman amplifier exceeds an intensity value at which stimulated Brillouin scattering occurs in the Raman amplifier; and
- increasing the driving power supplied to the light source after the modulation signal is input.

11. A method of driving an optical amplifier, comprising:
- outputting light having an intensity corresponding to a supplied driving power;
- modulating the output light in response to an input modulation signal;
- performing Raman amplification on the modulated light;
- inputting the input modulation signal to a modulator before the driving power is supplied to a light source and before an intensity of the light exceeds an intensity value at which stimulated Brillouin scattering occurs in a Raman amplifier; and
- increasing the supplied driving power after the modulation signal has been input.

* * * * *